United States Patent
Matsumoto et al.

(10) Patent No.: US 9,853,973 B2
(45) Date of Patent: *Dec. 26, 2017

(54) INFORMATION DISTRIBUTION SYSTEM, AND SERVER, ON-BOARD TERMINAL AND COMMUNICATION TERMINAL USED THEREFOR

(71) Applicant: Clarion Co., Ltd., Saitama-shi, Saitama (JP)

(72) Inventors: Takashi Matsumoto, Tokyo (JP); Atsushi Shimizu, Tokyo (JP); Hiroyoshi Endo, Saitama (JP); Susumu Kojima, Saitama (JP); Haruhiko Sawajiri, Saitama (JP)

(73) Assignee: CLARION CO., LTD, Saitama (JP)

( * ) Notice: Subject to any disclaimer, the term of this patent is extended or adjusted under 35 U.S.C. 154(b) by 44 days.

This patent is subject to a terminal disclaimer.

(21) Appl. No.: 14/301,814

(22) Filed: Jun. 11, 2014

(65) Prior Publication Data
US 2015/0012750 A1    Jan. 8, 2015

(30) Foreign Application Priority Data
Jul. 5, 2013   (JP) .................................. 2013-141303

(51) Int. Cl.
*H04L 29/06* (2006.01)
*G06F 21/10* (2013.01)

(52) U.S. Cl.
CPC .......... *H04L 63/0876* (2013.01); *G06F 21/10* (2013.01); *H04L 63/061* (2013.01)

(58) Field of Classification Search
CPC .................... H04L 63/0876; H04L 63/061
See application file for complete search history.

(56) References Cited

U.S. PATENT DOCUMENTS

| 6,718,470 B1* | 4/2004 | Adams ..................... G06F 21/33 713/175 |
| 2003/0147534 A1* | 8/2003 | Ablay ................... H04L 9/3271 380/270 |

(Continued)

FOREIGN PATENT DOCUMENTS

| CN | 102082799 A | 6/2011 |
| CN | 102316110 A | 1/2012 |

(Continued)

OTHER PUBLICATIONS

European Patent Office extended search report on application 14171279.4 dated Mar. 25, 2015; 6 pages.

(Continued)

*Primary Examiner* — Harris C Wang
(74) *Attorney, Agent, or Firm* — Foley & Lardner LLP

(57) ABSTRACT

Inherent terminal identification information and a terminal unique key are stored in an on-board terminal, and server-side terminal identification information and a server-side terminal unique key, which are same information as the above terminal identification information and terminal unique key are stored in a server. And, the on-board terminal transmits the terminal identification information to the server via a communication terminal, and the server performs terminal authentication according to the server-side terminal identification information, and if the authentication is success, transmits encrypted software for the on-board terminal of which authentication was success to the communication terminal. The communication terminal transmits the encrypted software to the on-board terminal, and the on-board terminal obtains a software unique key, which is encrypted by the server-side terminal unique key by the server, via the communication terminal, decrypts the (Continued)

encrypted software using the software unique key, and installs it.

8 Claims, 15 Drawing Sheets

(56) References Cited

U.S. PATENT DOCUMENTS

| | | | |
|---|---|---|---|
| 2003/0200459 A1* | 10/2003 | Seeman | G06F 21/10 726/26 |
| 2004/0150509 A1* | 8/2004 | Dunn | B60R 25/00 340/5.72 |
| 2008/0027602 A1* | 1/2008 | Yeap | B60R 25/04 701/31.4 |
| 2008/0195693 A1* | 8/2008 | Gao | G06F 8/65 709/202 |
| 2009/0138942 A1 | 5/2009 | Alrabady et al. | |
| 2011/0083011 A1* | 4/2011 | DiCrescenzo | H04L 9/006 713/158 |

FOREIGN PATENT DOCUMENTS

| | | |
|---|---|---|
| GB | 2 397 673 A | 7/2004 |
| JP | 2007-199972 A | 8/2007 |
| WO | WO 2010/054920 A1 | 5/2010 |

OTHER PUBLICATIONS

Chinese Office Action dated Mar. 20, 2017 as issued in corresponding Chinese Application No. 201410260856.2.

* cited by examiner

FIG. 5

300 ON-BOARD TERMINAL MANAGEMENT DB

| 301 SERVER-SIDE TERMINAL IDENTIFICATION INFORMATION | 302 SERVER-SIDE TERMINAL UNIQUE KEY | 303 LAST AUTHENTICATION TIMESTAMP |
|---|---|---|
| 012345678 | aX53oi=p754n3hhb | 2013/07/01/ 11:45:50 |
| 012345679 | +9h4ca37g-ZLri55 | 2012/12/24/ 00:01:01 |
| ... | ... | ... |

FIG. 14

330 ON-BOARD TERMINAL SOFTWARE MANAGEMENT DB

| SERVER-SIDE TERMINAL IDENTIFICATION INFORMATION | SOFTWARE IDENTIFICATION INFORMATION | EXPIRATION DATE STARTING POINT | EXPIRATION DATE THRESHOLD | SOFTWARE ACQUIRABLE FREQUENCY | SOFTWARE UNIQUE KEY ACQUIRABLE FREQUENCY | LAST AUTHENTICATION TIMESTAMP |
|---|---|---|---|---|---|---|
| 012345678 | 0001 | TIME OF AUTHENTICATION INFORMATION GENERATION | — | UNLIMITED | UNLIMITED | — |
| 012345678 | 0002 | TIME OF SOFTWARE DELIVERY | SEVEN DAYS | 3 | UNLIMITED | 2013/07/02 00:01:01 |
| 012345678 | 0003 | TIME OF UNIQUE KEY DELIVERY | ONE HOUR | UNLIMITED | 1 | 2013/07/05 18:00:03 |
| 012345679 | 0001 | TIME OF AUTHENTICATION INFORMATION GENERATION | — | UNLIMITED | UNLIMITED | — |
| 012345679 | 0002 | TIME OF SOFTWARE DELIVERY | SEVEN DAYS | 5 | UNLIMITED | — |
| 012345679 | 0003 | TIME OF UNIQUE KEY DELIVERY | ONE HOUR | UNLIMITED | 0 | 2013/07/06 08:00:08 |
| ... | ... | ... | ... | ... | ... | ... |

340 USER MANAGEMENT DB

| USER IDENTIFICATION INFORMATION | USER PASSWORD | POSSESSED TERMINAL IDENTIFICATION INFORMATION A | POSSESSED TERMINAL IDENTIFICATION INFORMATION B | POSSESSED TERMINAL IDENTIFICATION INFORMATION C | ... |
|---|---|---|---|---|---|
| aaa | AAA | 012345678 | 012349000 | — | ... |
| bbb | BBB | 012345679 | — | — | ... |
| ... | ... | ... | ... | ... | ... |

341　342　343　344　345

INFORMATION DISTRIBUTION SYSTEM, AND SERVER, ON-BOARD TERMINAL AND COMMUNICATION TERMINAL USED THEREFOR

INCORPORATION BY REFERENCE

The present application claims priority from Japanese applications JP2013-141303 filed on Jul. 5, 2013, the content of which is hereby incorporated by reference into this application.

BACKGROUND OF THE INVENTION

The present invention relates to a technology that distributes information from a server to an on-board terminal for car navigation or the like capable of externally connecting a communication device such as a cellular phone.

A communication terminal such as a high function cellular phone so-called "smart phone") has become common to perform data communication through a wireless LAN (Local Area Network) or a mobile communication network such as an LTE (Long Term Evolution) network. The high function cellular phone can execute a variety of software similar to a PC (Personal Computer), and a user can freely install such software. Since the high function cellular phone has the above features, its affinity to the Web service is high, and various services are provided.

On-board terminals such as car navigation units which are often not provided with a communication function use a communication terminal including a high function cellular phone r the like and inter-equipment communications such as USB (Universal Serial Bus) and Bluetooth (registered trademark) to use indirectly a service assuming data communication such as a Web service on the communication terminal side. For example, when the communication terminal retrieves information on a destination by an Internet search function and instructs a search for a route to the destination, information on the destination is transmitted to the car navigation side. And, the car navigation device performs a route search, and the result is shown on the car navigation device.

The above cooperation between the communication terminal and the on-board terminal is realized by cooperation between their software. Provision of the cooperation function by the software facilitates the addition of software by the user, and for example, it becomes possible to add software corresponding to a new service. It is general for the communication terminal that delivery of software which operates on the terminal, such as delivery of an application or an update of an OS (Operating System), is performed from a server through a communication network. The delivery of software, which operates on the onboard terminal, to the onboard terminal is also performed from the server through the communication network by connecting to the communication terminal.

According to the above method, a vehicle occupant connects the communication terminal, which is in a state connected to the onboard terminal in the vehicle, to the server, selects software desired to be obtained, takes the purchase procedure if necessary, and obtains the desired software into the on-board terminal from the server through the communication network and the communication terminal.

The above conventional technology, however, needs to keep the communication terminal the state connected to the on-board terminal until the software acquisition is completed, and for example, it takes a long time to obtain large capacity software, and there was a problem that the vehicle occupant cannot leave the vehicle until the software acquisition was completed.

To solve the problem, there is a technology described in JP-A-2007-199972 According to the technology described in JP-A-2007-199972, a download system for vehicles comprises a server equipped with an e-commerce site for selling software or content data on-line, a communication terminal having identification information for the communication terminal, and an on-board terminal which stores the identification information for the communication terminal and has identification information for the on-board terminal, transmits the identification information for the on-board terminal and the identification information for the communication terminal to the server via the communication terminal, purchases data according to the identification information, stores the purchased data into the cellular phone, and obtains the stored data by the on-board terminal.

Thus, the on-board terminal accesses the server via the communication terminal, the server specifies the on-board terminal using the identification information for the on-board terminal, further specifies software for the specified on-board terminal, and transmits it to the communication terminal which temporarily stores the software transmitted from the server.

Thus, it is not necessary to keep the communication terminal in a state connected to the on-board terminal until the acquisition of software is completed, and the software can be obtained continuously even if the owner of the communication terminal leaves the vehicle while the owner carries the communication terminal.

SUMMARY OF THE INVENTION

According to the technology described in JP-A-2007-199972, however, the identification information and the software of the on-board terminal are not protected in a security aspect. Therefore, unauthorized use of software, such as unauthorized acquisition of software by spoofing a regular on-board terminal, copying and distributing software by unauthorized means, and the like cannot be prevented.

The present invention has been achieved under the circumstances described above and aims to provide a technology that can prevent unauthorized use of software.

As means for solving the above problem, the technology described in claims is used. For example, it is an information distribution system including a communication terminal, an on-board terminal which can be connected to the communication terminal by wire or wireless, and a server, wherein the on-board terminal is provided with an on-board terminal identification information storage section for storing terminal identification information inherent to the on-board terminal, an authentication information generation section for generating the on-board terminal authentication information including the terminal identification information stored in the on-board terminal identification information storage section, and an inter-terminal equipment communication section for transmitting the authentication information generated by the authentication information generation section to the communication terminal, the communication terminal is provided with an inter-equipment communication section which can be connected to the on-board terminal by wire or wireless, a storage section for storing the on-board terminal authentication information received by the inter-equipment communication section, and a server communication section which can transmit the on-board terminal authentication information stored in the storage section to the server, the server is provided with a terminal communication section for receiving the on-board terminal authentication information from the communication terminal, an authentication information verification processing section for authenticating the on-board terminal authentication information received by the terminal communication section, a last authentication timestamp storage section for storing the timestamp when authentication is success by the authentication information verification processing section, and an authentication information management section for storing the timestamp, when the authentication is success by the authentication information verification processing section, into the last authentication timestamp storage section, and the server, when it receives the on-board terminal authentication information from the communication terminal, authenticates the on-board terminal authentication information using a timestamp when on-board terminal authentication information is authenticated by the authentication information verification processing section, and a timestamp stored in the last authentication timestamp storage section.

According to the present invention, there can be provided an information distribution method, an information distribution system and an on-board terminal which prevent unauthorized use of software.

The other objects, features and advantages of the invention will become apparent from the following description of the embodiments of the invention taken in conjunction with the accompanying drawings.

BRIEF DESCRIPTION OF THE DRAWINGS

FIG. 5 is a view explaining a structure of data stored in an on-board terminal management DB according to the first embodiment of the invention.

FIG. 14 is a view explaining a structure of data stored in on-board terminal software management DB related to a fourth embodiment of the invention.

FIG. 15 is a view explaining a structure of data stored in a user management DB related to a fifth embodiment of the invention.

DETAIL DESCRIPTION OF THE EMBODIMENTS

An information distribution system 1 and others according to embodiments of conducting the present invention (hereinafter referred to as "the embodiment of the invention") are described below. A communication terminal 20 according to the embodiments of the invention is for example a high function cellular phone, but it may be a communication device which is connected with an on-board terminal 10 and a server 30 and can send receive software and the like.

First Embodiment

First, an information distribution system 1 according to a first embodiment of the invention is described. The first embodiment of the invention is an example that a single on-board terminal 10 obtains software from the server 30 via the communication terminal 20.

Figure 1:
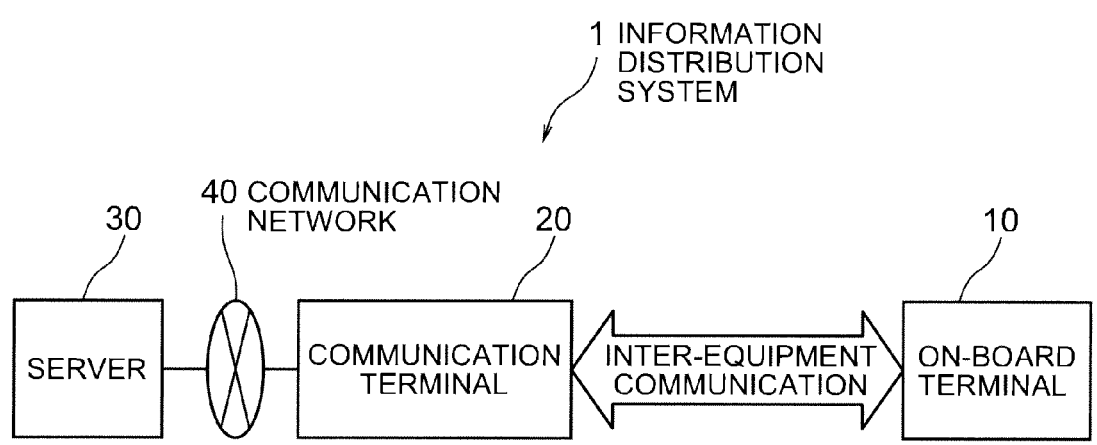
FIG. 1 is a view explaining an overall configuration of an information distribution system according to a first embodiment of the present invention.

FIG. 1 is a view explaining an overall configuration of the information distribution system 1 according to the first embodiment of the invention.

As shown in FIG. 1, the information distribution system 1 according to the first embodiment of the invention is comprised of the on-board terminal 10, the communication terminal 20, and the server 30. The on-board terminal 10 is an on-board terminal (for example, car navigation unit) which is not provided with a communication function by means of a communication line or the like and connected to the communication terminal 20 by inter-equipment communication. The inter-equipment communication here indicates an inter-device communication function that is generally possessed by the on-board terminal 10 and the communication terminal 20 such as USB, Bluetooth and wireless LAN (Local Area Network). The communication terminal 20 is such as a high function cellular phone, for example a smart phone, which performs data communication using a mobile communication network or a wireless LAN such as an LTE network. The communication terminal 20 is connected to the Internet through a communication network 40. And, the on-board terminal 10 can be connected to the Internet via the communication terminal 20. The server 30 is provided with a function which delivers software to the on-board terminal 10 via the communication terminal 20, and the communication terminal 20 and the server 30 are connected through the Internet. In the following description, it is determined that the communication to final 20 and the server 30 are connected to the Internet using HTTP (Hypertext Transfer Protocol), but the connection of the communication terminal 20 and the server 30 according to the invention is not limited to the HTTP.

Next, the respective devices configuring the information distribution system 1 according to the first embodiment of the invention are described specifically.

<On-Board Terminal>

Figure 2:
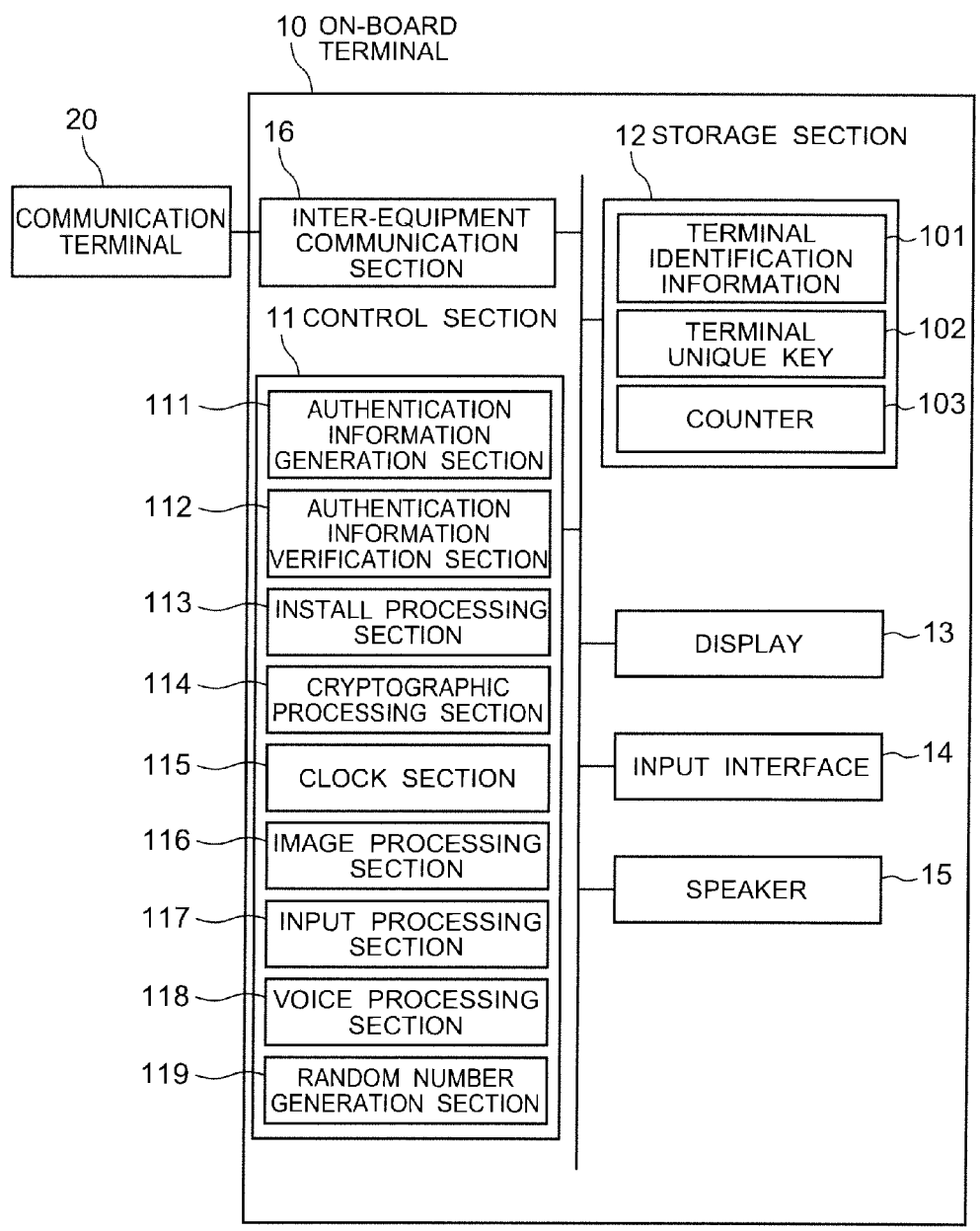
FIG. 2 is a functional block diagram showing a structure example of an on-board terminal according to the first embodiment of the invention.

FIG. 2 is a functional block diagram showing a structure example of the on-board terminal 10 according to the first embodiment of the invention.

As shown in FIG. 2, the on-board terminal 10 is configured including a control section 11, a storage section 12, a display 13, an input interface 14, a speaker 15, and an inter-equipment communication section 16.

The control section 11 controls the on-board to final 10 as a whole and is configured including an authentication information generation section 111, an authentication information verification section 112, an install processing section 113, a cryptographic processing section 114, a clock section 115, an image processing section 116, an input processing section 117, a voice processing section 118 and a random number generation section 119. The function of the control section 11 is realized by for example expanding the program stored in the storage section 12 of the on-board terminal 10 into an unshown memory (such as a RAM) and executing by the CPU (Central Processing Unit).

The authentication information generation section 111 generates terminal authentication information which is used for authentication of the on-board terminal 10 by the server 30 and software unique key request information for obtaining a software decrypting key (hereinafter called as the "software unique key") which is used to decrypt the encrypted software, which is from the server 30, before installing.

Specifically, the authentication information generation section 111 generates as terminal authentication information (hereinafter called as "A" information), information including:

(A-1) a later described terminal identification information 101 within the storage section 12, (A-2) timestamp obtained from the clock section 115, and (A-3) information (encrypted information) obtained by encrypting the terminal identification information 101 and the timestamp by the cryptographic processing section 114 using a terminal unique key 102 within the storage section 12.

The authentication information generation section 111 also generates, as software unique key request information (hereinafter called as "B" information) information including:

(B-1) a later described terminal identification information 101 within the storage section 12, (B-2) timestamp obtained from the clock section 115, (B-3) identification information on the software obtained from the server 30 via the communication terminal 20, and (B-4) information (encrypted information) obtained by encrypting the terminal identification information 101, timestamp and software identification information by the cryptographic processing section 114 using the terminal unique key 102 within the storage section 12.

The authentication information verification section 112 verifies whether or not software unique key authentication information (hereinafter called as "C" information) obtained from the server 30 via the communication terminal 20 is altered.

The software unique key authentication information ("C" information) is information which is generated by an authentication information generation processing section 313 of the server 30 described later.

This software unique key authentication information ("C" information) is configured including:

(C-1) software identification information, and (C-2) information (encrypted information) obtained by encrypting the software identification information and the software unique key using a server-side terminal unique key 302 (see FIG. 5 described later). The software unique key authentication information is described later in detail.

As specific processing, the authentication information verification section 112 decrypts the (C-2) encrypted information of the software unique key authentication information ("C" information) by the terminal unique key 102 stored in its storage section 12 and verifies whether or not identification information on the decrypted software and (C-1) software identification information of the software unique key authentication information agree with each other. And, if they do not agree with each other, the authentication information verification section 112 determines that the software unique key authentication information is altered and terminates the processing. Meanwhile, if they agree with each other, the authentication information verification section 112 determines that validity was confirmed (authentication was passed) by verification of the software unique key authentication information ("C" information and decrypts the later described encrypted software stored in the storage section 12 by the software unique key which is simultaneously obtained at the time of decrypting.

The install processing section 113 installs the software decrypted by the authentication information verification section 112.

According to the instruction from the authentication information generation section 111, the cryptographic processing section 114 encrypts the terminal identification information 101 and the timestamp using the terminal unique key 102 within the storage section 12. And, the encrypted information is delivered to the authentication information generation section 111.

And, also according to the instruction from the authentication information generation section 111, the cryptographic processing section 114 encrypts the terminal identification information 101, the timestamp and the software identification information using the terminal unique key 102 within the storage section 12. And the encrypted information is delivered to the authentication information generation section 111.

Upon receiving the instruction from the authentication information generation section 111, the clock section 115 delivers the instruction received timestamp to the authentication information generation section 111.

The image processing section 116 performs processing to generate a display image showing a processing stage to install the software at a current time and to show on the display 13.

The input processing section 117 obtains input information on the user via the input interface 14.

The voice processing section 118 performs processing to output a processing stage to install the software at a current time as the voice information to the speaker 15.

The random number generation section 119 performs processing to output a pseudo random number with reduced regularity and periodicity generated mathematically by software and to output a random number by the control of an unshown hardware random number generator.

The storage section 12 is configured of a non-volatile memory such as a hard disk or a flash memory, and stores the terminal identification information 101, the terminal unique key 102 and the counter 103.

The terminal identification information 101 is information for uniquely specifying the terminal, such as a product number, a model number and a serial number of the on-board terminal 10. The on-board terminal 10 is uniquely specified by the terminal identification information 101, and a kind of the on-board terminal 10 showing a product number, a model (type), a version, etc. can be specified by the server 30.

And, the terminal unique key 102 is information used for cryptographic processing and has a value different for every on-board terminal 10, namely for every terminal identification information 101. For the pair of the terminal identification information 101 and the terminal unique key 102, the server 30 stores the same information as a pair of server-side terminal identification information 301 and the server-side terminal unique key 302.

The counter 103 stores an inherent value of every on-board terminal 10. As to the inherent value of each on-board terminal 10, the same value is stored as a pair with the terminal identification information in a counter control DB 350 of the server 30 described later.

The display 13 is a display device for showing information such as a route and a destination and shows information indicating a software install processing stage via the image processing section 116.

The input interface 14 is an input device such as a touch panel, an input button, and a remote controller.

The speaker 15 outputs information showing a software install processing stage as voice information.

The inter-equipment communication section 16 controls communications through USB, Bluetooth, wireless LAN, etc. and performs transmission and reception of information with the communication terminal 20.

<Communication Terminal>

Next, the communication terminal 20 according to the first embodiment of the invention is explained.

Figure 3:
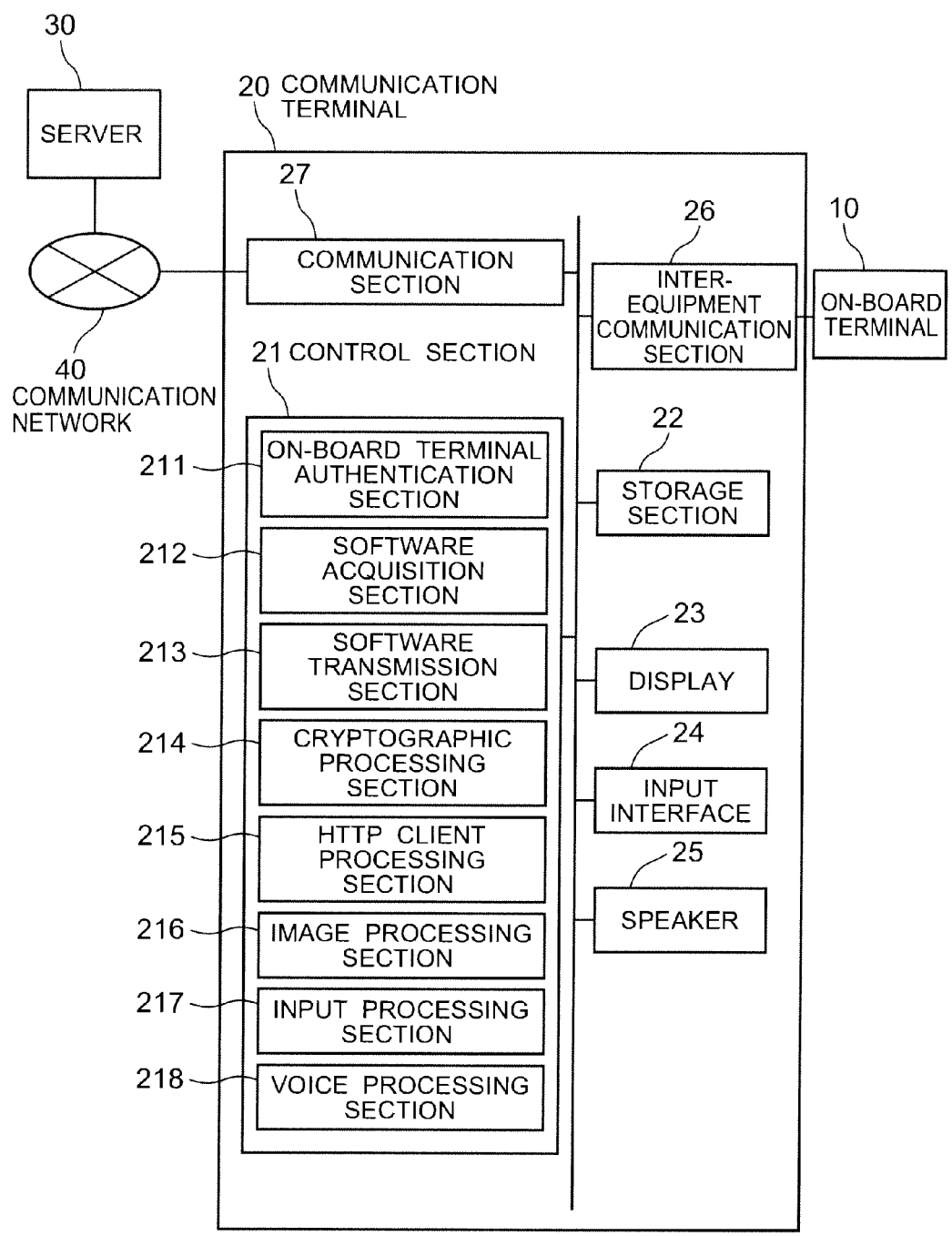
FIG. 3 is a functional block diagram showing a structure example of a communication terminal according to the first embodiment of the invention.

FIG. 3 is a functional block diagram showing a structure example of the communication terminal 20 according to the first embodiment of the invention.

As shown in FIG. 3, the communication terminal 20 is configured including a control section 21, a storage section 22, a display 23, an input interface 24, a speaker 25, an inter-equipment communication section 26, and a communication section 27.

The control section 21 controls the communication terminal 20 as a whole and is configured including an on-board terminal authentication section 211, a software acquisition section 212, a software transmission section 213, a cryptographic processing section 214, an HTTP client processing section 215, an image processing section 216, an input processing section 217 and a voice processing section 218. The function of the control section 21 is realized by for example, expanding the program stored in the storage section 22 of the communication terminal 20 into an unshown memory (such as a RAM) and executing by the CPU.

The on-board terminal authentication section 211 controls the entire terminal authentication processing of the on-board terminal 10 connected by the inter-equipment communication.

Specifically, when the onboard terminal authentication section 211 receives an instruction to start terminal authentication from the user via the input processing section 217, it sends an authentication information request message requesting terminal authentication information ("A" information) to the on-board terminal 10 connected by inter-equipment communication, and receives terminal authentication information from the on-board terminal 10.

Next, the onboard terminal authentication section 211 sends a terminal authentication request message attached with the terminal authentication information to the server 30. And, when the server 30 receives an authentication success message indicating that verification of terminal authentication information was success, it stores the terminal authentication information ("A" information) attached to the authentication success message into the storage section 22. And, the on-board terminal authentication section 211 transmits a terminal authentication completion message indicating the completion of terminal authentication to the on-board terminal 10.

The software acquisition section 212 controls the entire processing of obtaining software from the server 30.

Specifically, when the software acquisition section 212 is instructed to start the software acquisition from the user aria the input processing section 217, it transmits a software acquisition request message attached with the terminal authentication information ("A" information) stored in the storage section 22 to the server 30 through the communication network 40.

And, when the software acquisition section 212 receives from the server 30 a URL which is a download destination of the software, it accesses the download destination URL of the software with the terminal authentication information ("A" information), which was stored in its storage section 22, attached via the HTTP client processing section 215.

And, the software acquisition section 212 receives software (hereinafter called the "encryption software") in a state encrypted by the software unique key, and stores its encryption software into the storage section 22.

The software transmission section 213 transmits the encryption software to the on-board terminal 10, and a series of processing which is required for the on-board terminal 10 to obtain a software unique key for decrypting the encryption software from the server 30 is performed.

Specifically, when the software transmission section 213 is instructed to request software installation from the user via the input processing section 217, it sends encryption software, which is stored in the storage section 22, to the on-board terminal 10 which is connected by inter-equipment communication.

And, when the software transmission section 213 receives software unique key request information ("B" information) from the on-board terminal 10, it transmits a software unique key request message attached with its software unique key request information to the server 30 through the communication network 40.

And, the software transmission section 213 receives software unique key authentication information ("C" information) from the server 30, and transmits its software unique key authentication information to the on-board terminal 10.

The cryptographic processing section 214 performs cryptographic processing, for example, SSL (Secure Sockets Layer)/TSL (Transport Layer Security) or the like of information which is sent to/received from the server 30 through the communication network 40. In a later description, the explanation is omitted, but all communications between the communication terminal 20 and the server 30 are sent/received as encrypted information by the cryptographic processing section 214.

According to HTTP (Hyper Text Transfer Protocol), the HTTP client processing section 215 controls the processing of sending/receiving information to the URL obtained by the software acquisition section 212 from the server 30.

The image processing section 216 generates a display image showing a processing stage at the current time of installing software to the on-board terminal 10, and performs processing to show on the display 23.

The input processing section 217 obtains the input formation of the user through input interface 24.

The voice processing section 218 performs processing to output the processing stage at the current time of installing the software to the on-board terminal 10 as voice information to the speaker 25.

And, the inter-equipment communication section 26 controls communication s through USB, Bluetooth, wireless LAN, etc. and performs transmission and reception of information with the on-board terminal 10.

The communication section 27 cont rots information which is sent to/received from the server 30 through the communication network 40 such as a mobile communication network or a wireless LAN.

<Server>

Next, the server 30 according to the first embodiment of the invention is described.

Figure 4:
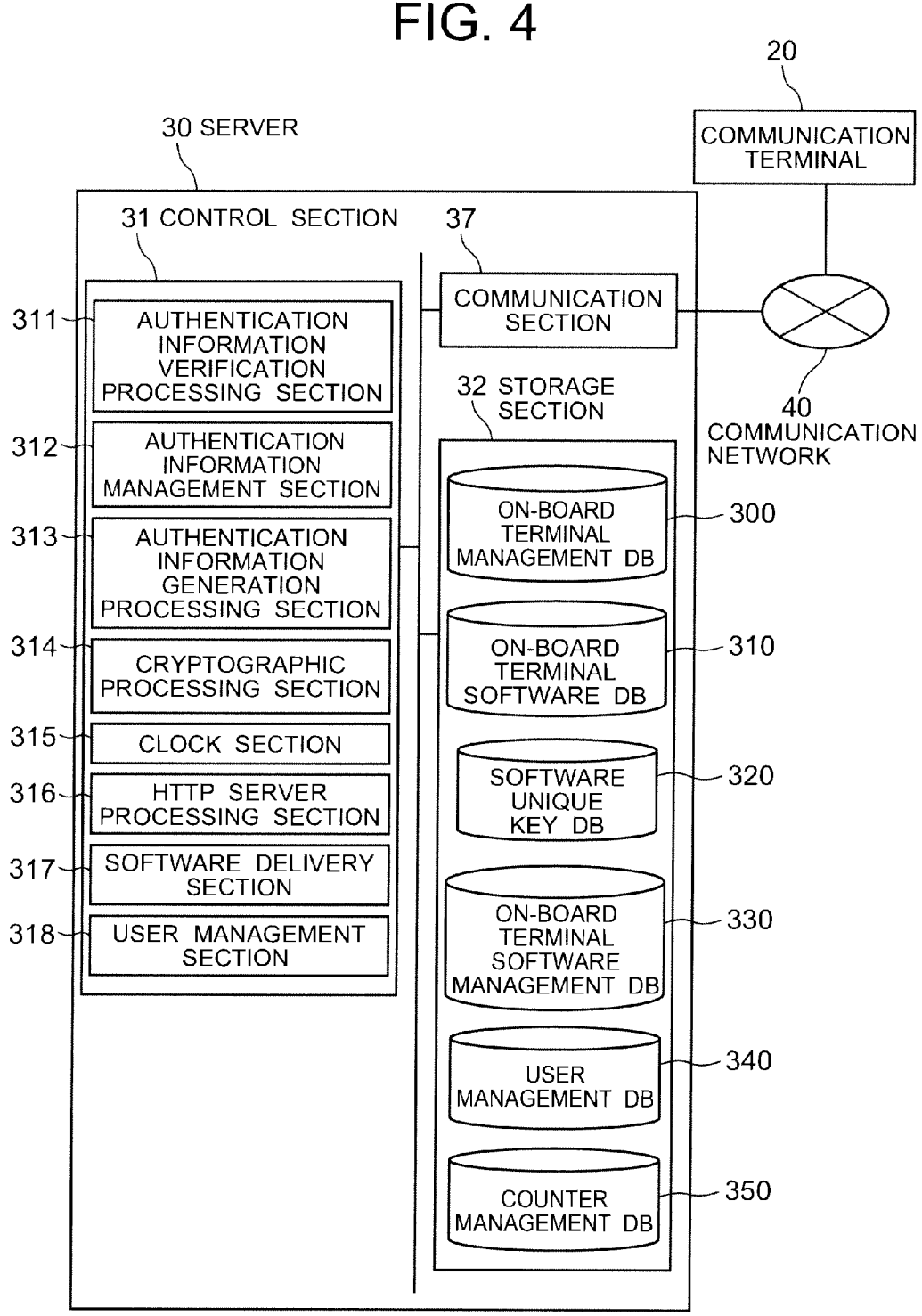
FIG. 4 is a functional block diagram showing a structure example of a server according to the first embodiment of the invention.

FIG. 4 is a functional block diagram showing a structure example of the server 30 according to the first embodiment of the invention.

As shown in FIG. 4, the server 30 is configured including a control section 31, a storage section 32, and a communication section communication section 37.

The storage section 32 stores an on-board terminal management DB (DataBase) 300, an on-board terminal software DB 310, a software unique key DB 320, an on-board terminal software management DB 330, a user management DB 340, and a counter management DB 350.

FIG. 5 is a view explaining a structure of data stored in the on-board terminal management DB 300 according to the first embodiment of the invention.

As shown in FIG. 5, the on-board terminal management DB 300 stores the server-side terminal unique key 302 and a last authentication timestamp 303 in correspondence with the server-side terminal identification information 301.

Information of the pair of this server-side terminal identification information 301 and the server-side terminal unique key 302 is same as the information of the pair of the terminal identification information 101 and the terminal unique key 102 stored in the on-board terminal 10.

The last authentication timestamp 303 is information which is updated by performing authentication of terminal authentication or software unique key request information by a later described authentication information management section 312 and storing the timestamp when authentication performed every time was success.

Back to FIG. 4, software corresponding to each kind such as a type and a version of the on-board terminal 10 is stored in the on-board terminal software DB 310. And, the software which is stored in the on-board terminal software DB 310 may be stored in a state previously encrypted (encryption software) by a corresponding and later described software unique key.

The software unique key DB 320 stores a software unique key which is a key for decrypting each piece of software stored in the on-board terminal software DB 310. This software unique key is stored in correspondence with software identification information described later.

A usage situation of software of each on-board terminal is stored in the on-board terminal software management DB 330.

User identification information, information such as a password used for authentication of the user identification information and a license of the software owned by the user are stored in the user management DB 340.

Terminal identification information and a set of inherent values for every terminal identification information are stored in the counter management DB 350. For an inherent numerical string for each terminal identification information, the same value as the value stored in the counter 103 of the above-described on-board terminal 10 is stored.

The control section 31 controls the entire server 30 and is configured including an authentication information verification processing section 311, an authentication information management section 312, an authentication information generation processing section 313, a cryptographic processing section 314, a clock section 315, an HTTP server processing section 316, a software delivery section 317 and a user management section 318. The function of the control section 31 is realized by, for example, expanding a program stored in the storage section 32 of the server 30 by CPU to an unshown memory (such as RAM) and executing it.

The authentication information verification processing section 311 controls a whole of verification of authentication information related to terminal authentication of the on-board terminal 10, software delivery, etc.

Specifically, the authentication information verification processing section 311 receives a terminal authentication request message attached with terminal authentication information ("A" information) from the communication terminal 20, and obtains, from the terminal authentication information, (A-1) terminal identification information 101, (A-2) timestamp, and (A-3) information (encrypted information) having the terminal identification information 101 and the timestamp encrypted using the terminal unique key 102. And, the authentication information verification processing section 311 retrieves the on-board terminal management DB 300 in the storage section 32 using the (A-1) terminal identification information 101 obtained from the terminal authentication information as a key. Specifically, first, the authentication information verification processing section 311 retrieves the server-side terminal identification information 301 which agrees with (A-1) terminal identification information 101 and obtains its last authentication timestamp 303.

Next, the authentication information verification processing section 311 compares the (A-2) timestamp with a value obtained by subtracting a prescribed threshold from the obtained last authentication timestamp 303. And, when the value obtained by subtracting the threshold from the last authentication timestamp 303 is newer than the (A-2) timestamp, there is a possibility of unauthorized access such as a replay attack, and the authentication information verification processing section 311 determines it as authentication NG and terminates the processing. Meanwhile, if a value obtained by subtracting the threshold from the last authentication timestamp 303 is older than the (A-2) timestamp, the authentication information verification processing section 311 encrypts terminal authentication information: (A-1) terminal identification information 101, and (A-2) timestamp, using the server-side terminal unique key 302 via the cryptographic processing section 314. And, if the encrypted result agrees with the (A-3) encrypted information which is encrypted by the on-board terminal 10, the authentication information verification processing section 311 judges that it is an authentication request from the on-board terminal 10 having the correct terminal unique key 102, and the authentication is passed (authentication OK).

And in the above-described processing that the value obtained by subtracting threshold from the last authentication timestamp 303 is older than the (A-2) timestamp, if information obtained by decrypting the (A-3) encrypted information using the server-side terminal unique key 302 by the cryptographic processing section 314 agrees with the (A-1) terminal identification information 101 and the (A-2) timestamp, it is judged as an authentication request from the on-board terminal 10 having a correct terminal unique key 102, and the authentication may be passed (authentication OK).

When the terminal authentication information ("A" information) is a first authentication request from the on-board terminal 10 to the server 30 and if information is not stored in the last authentication timestamp 303, the authentication information verification processing section 311 does not compare the (A-2) timestamp and the last authentication timestamp 303, but encrypts the terminal authentication information: the (A-1) terminal identification information 101 and the (A-2) timestamp by the server-side terminal unique key 302, and proceeds to judgement whether or not it agrees with the (A-3) encrypted information.

Here, reasons of introducing the threshold are described. When terminal authentication information is handled as information which is generated when the on-beard terminal 10 is connected and becomes invalid when communication is disconnected, processing performed by the communication terminal 20 and the server 30 only without via the on-board terminal 10 similar to the software acquisition processing shown in FIG. 7 described later becomes impossible, and the convenience of the user is impaired. Meanwhile, when the terminal authentication information is handled as information which is generated when the on-board terminal 10 is connected and becomes valid permanently after that, the terminal authentication information which is transmitted to the server 30 at the time of connection becomes a fixed value, so that if the terminal authentication information leaks, unauthorized access becomes possible permanently. To solve the above problems, it is aimed to reduce a risk of unauthorized access without impairing the convenience of the user by providing a prescribed period, namely a threshold, and processing as invalid information the terminal authentication information having old timestamp exceeding the threshold value. And, since it is assumed that the timestamp shown by the respective clock sections 315 and 115 deviates between the server 30 and the on-board terminal 10 or connection is impossible depending on a communication state or the like between the server 30 and the on-board terminal 10, the operation is facilitated by providing a certain allowance to the threshold.

For the threshold, a prescribed time (a minute unit, an hour unit, a day unit, etc.) is set by an administrator operating the service. Unauthorized access by a third party can be prevented as a preset time of the threshold is shorter, but if regular user processing delays, it is determined as unauthorized access, and a possibility that authentication information becomes invalid is increased. Meanwhile, there is a relationship in which if the preset time of the threshold becomes longer, the possibility that authentication of the regular user becomes invalid is low, but unauthorized access by a third party increases.

When the authentication information verification processing section 311 receives a software unique key request message attached with software unique key request information ("B" information) from the communication terminal 20, it obtains, from the software unique key request information, (B-1) terminal identification information 101, (B-2) timestamp, (B-3) software identification information, and (B-4) information (encrypted information) obtained by encrypting the terminal identification information 101, timestamp and software identification information using the terminal unique key 102, and retrieves the on-board terminal management DB 300 within the storage section 32. Specifically, the authentication information verification processing section 311 retrieves the server-side terminal identification information 301 which agrees with the (B-1) terminal identification information 101 obtained from the software unique key request information, and obtains its last authentication timestamp 303.

Next, the authentication information verification processing section 311 compares the (B-2) timestamp with the value obtained by subtracting the threshold from the last authentication timestamp 303 of the on-board terminal management DB 300. And, if the value obtained by subtracting the threshold from the last authentication timestamp 303 is newer than the (B-2) timestamp, the authentication information verification processing section 311 determines as authentication NG and terminates the processing because it is possibly unauthorized access such as a replay attack. On the other hand, if the value obtained by subtracting the threshold from the last authentication timestamp 303 is older than the (B-2) timestamp, the authentication information verification processing section 311 encrypts the software unique key request information: (B-1) terminal identification information 101, (B-2) timestamp, and (B-3) software identification information using the server-side terminal unique key 302 via the cryptographic processing section 314. And, if the encrypted result agrees with the (B-4) encrypted information which is encrypted by the on-board terminal 10, the authentication information verification processing section 311 judges that it is an authentication request from the on-board terminal 10 having a correct terminal unique key 102, and the authentication is passed (authentication OK).

And, in the above-described processing in which the value obtained by subtracting the threshold from the last authentication timestamp 303 is older than the (B-2) timestamp, if information which is obtained by decrypting the (B-4) encrypted information using the server-side terminal unique key 302 by the cryptographic processing section 314 agrees with identification information of the (B-1) terminal identification information 101, the (B-2) timestamp and the (B-3) software, it is judged as an authentication request from the on-board terminal 10 having a correct terminal unique key 102, and the authentication may be passed (authentication OK).

If the to final authentication information ("A information") received by the authentication information verification processing section 311 or the terminal authentication information ("A information") received just before the software deliver processing to the communication terminal 20 is authentication OK, the authentication information management section 312 obtains timestamp from the clock section 315 and updates the last authentication timestamp 303 of the on-board terminal management DB 300.

The authentication information generation processing section 313 generates software unique key authentication information ("C" information) which is information for transmitting the software unique key from the server 30 to the on-board terminal 10.

Specifically, the authentication information generation processing section 313 retrieves the software unique key DB 320 within the storage section 32 using software identification information, and obtains a corresponding software unique key. Next, the authentication information generation processing section 313 generates, as software unique key authentication information, the (C-1) software identification information and the (C-2) information (encrypted information) obtained by encrypting the software identification information and the obtained software unique key by the cryptographic processing section 314 using the server side terminal unique key 302 within the on-board terminal management DB 300. And, the authentication information generation processing section 313 transmits the generated software unique key authentication information to the on-board terminal 10 via the communication terminal 20.

According to the instruction from the software delivery section 317, the cryptographic processing section 14 encrypts the software stored in the on-board terminal software DB 310 using the software unique key stored in the software unique key DB 320.

And, according to the instruction from the authentication information generation processing section 313, the cryptographic processing section 314 encrypts the software identification information and the software unique key using the server-side terminal unique key 302 of the on-board terminal management DB 300. The encrypted information is delivered to the authentication information generation processing section 313.

And, the cryptographic processing section 314 performs cryptographic processing of information for transmission and reception with the communication terminal 20 through the communication network 40, for example such as SSL/TSL.

When the clock section 315 receives an instruction from the authentication information management section 312 or the authentication information generation processing section 313, it delivers the timestamp at that moment.

According to HTTP, the HTTP server processing section 316 generate s a URL from which the communication terminal 20 obtains software, and transmits to the communication terminal 20. And, the HTTP server processing section 316 accepts access from the communication terminal 20 to the URL.

When the software unique key request information ("B" information) received by the authentication information verification processing section 311 is authentication OK, the software delivery section 317 retrieves the on-board terminal software DB 310 within the storage section 32, uses the terminal identification information 101, retrieves software conforming to the on-board terminal 10 to obtain encryption software. If software is not encrypted, the software delivery section 317 generates encryption software which is encrypted by the software unique key via the cryptographic processing section 314.

And, the software delivery section 317 retrieves the software unique key DB 320 with the (B-3) software identification information of the software unique key request information used as a key, and retrieves the software unique key to be transmitted to the on-board terminal 10.

The user management section 318 manages the user management DB 340, and performs addition and rewriting of data to the on-board terminal software management DB 330.

The communication section 37 controls information which is sent to/received from the communication terminal 20 through the communication network 40 such as a mobile communication network, a wireless LAN or the like.

Next, information distribution processing performed by the information distribution system 1 according to the first embodiment of the invention is described. As this information distribution processing, (1) terminal authentication processing that the terminal identification information 101 of the on-board to terminal 10 is authenticated by the server 30 via the communication terminal 20, (2) software acquisition processing that software conforming to the on-board terminal 10 is obtained by the communication terminal 20 from the server 30, and (3) processing (software unique key acquisition processing) that the on-board terminal 10 obtains the software unique key via the communication terminal 20 and installs software, are performed to obtain software by the on-board terminal 10 from the server 30. The flow of each processing is described below specifically.

<Terminal Authentication Processing>

Figure 6:
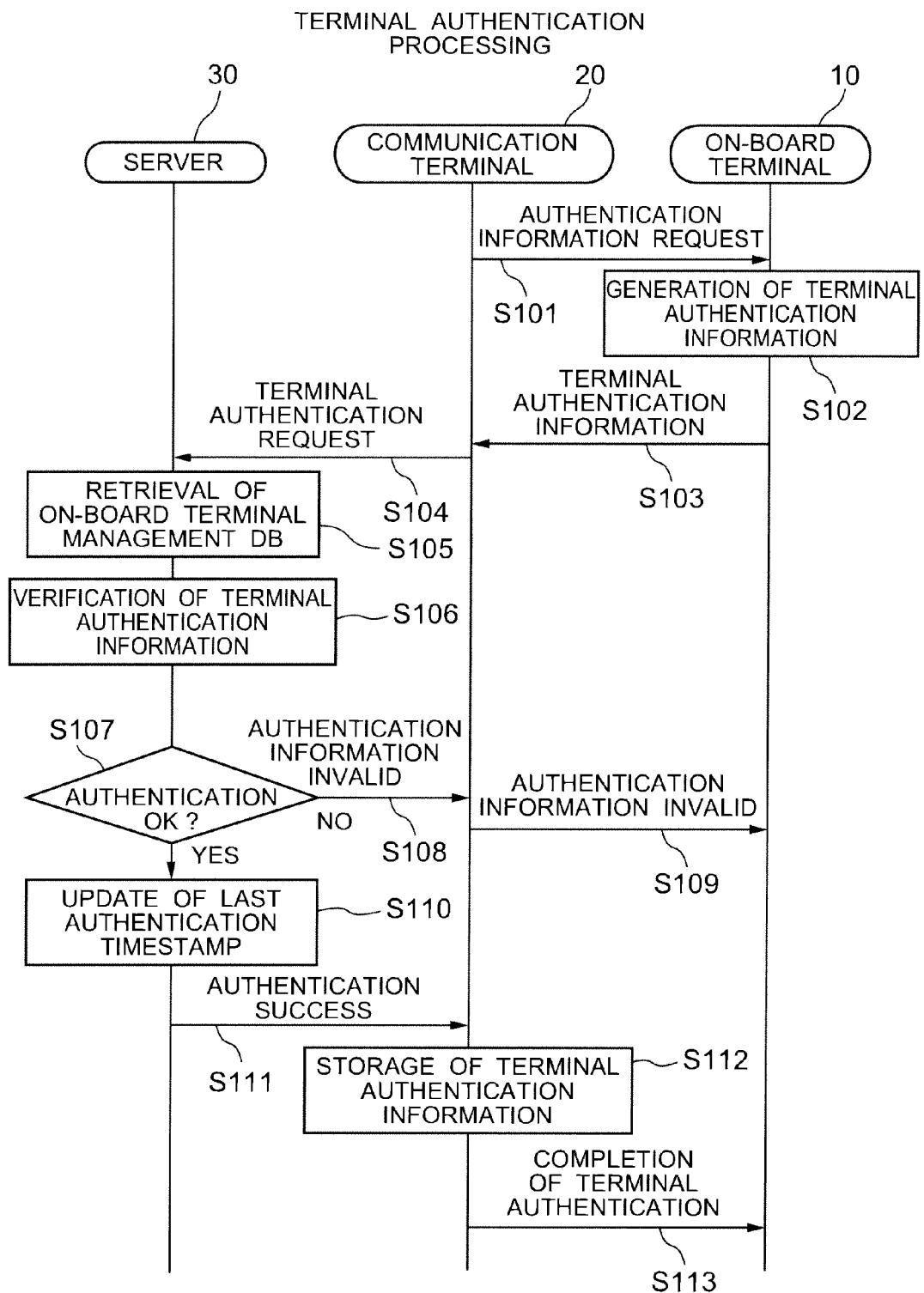
FIG. 6 is a sequence diagram showing a flow of terminal authentication processing conducted by the information distribution system according to the first embodiment of the invention.

FIG. 6 is a sequence diagram showing a flow of terminal authentication processing performed by the information distribution system 1 according to the first embodiment of the invention. This terminal authentication processing is processing that the terminal authentication information ("A" information) generated by the on-board terminal 10 is authenticated by the server 30, and if the authentication is a success, the communication terminal 20 stores its terminal authentication information ("A" information).

First, when the user operates to instruct to start the terminal authentication of the on-board terminal 10 via the input interface 24 of the communication terminal 20, the on-board terminal authentication section 211 of the communication terminal 20 sends an authentication information request message to request terminal authentication information ("A" information) to the on-board terminal 10 (step S101).

In addition to the operation by the user, the authentication information request message may be transmitted when for example the communication terminal 20 detects a software event that requires terminal authentication of the on-board terminal 10.

Next, when the on-board terminal 10 receives the authentication information request message, the authentication information generation section 111 generates terminal authentication information ("A" information) (step S102).

Specifically, the authentication information generation section 111 obtains the terminal identification information 101 from the storage section 12, and obtains current timestamp from the clock section 115. And, the authentication information generation section 111 delivers the obtained (A-1) terminal identification information 101 and (A-2) timestamp to the cryptographic processing section 114, and the cryptographic processing section 114 uses the terminal unique key 102 to encrypt the (A-1) terminal identification information 101 and the (A-2) timestamp, and delivers the encrypted information to the authentication generation section 111. And, the authentication information generation section 111 generates terminal authentication information ("A" information) including (A-1) terminal identification information 101, (A-2) timestamp, and (A-3) information (encrypted information) obtained by encrypting the terminal identification information 101 and timestamp by the terminal unique key 102.

Subsequently, the authentication information generation section 111 of the on-board terminal 10 transmits the generated terminal authentication information ("A" information) to the communication terminal 20 (step S103).

And, the on-board terminal authentication section 211 of the communication terminal 20 transmits the terminal authentication request message attached with the received terminal authentication information ("A" information) to the server 30 (step S104).

The server 30 retrieves the on-board terminal management DB 300 according to the terminal authentication information attached to the terminal authentication request message received from the communication terminal 20 (step S105).

Specifically, the authentication information verification processing section 311 of the server 30 obtains (A-1) terminal identification information 101, (A-2) timestamp, and (A-3) information (encrypted information) obtained by encrypting the terminal identification information 101 and the timestamp by the terminal unique key 102 from the terminal authentication information. And, the authentication information verification processing section 311 retrieves the on-board terminal management DB 300 using as a key the (A-1) terminal identification information 101 obtained from the terminal authentication information, retrieves the server-side terminal identification information 301 agreeing with the (A-1) terminal identification information 101, and obtains its last authentication timestamp 303.

Next, the authentication information verification processing section 311 of the server 30 verifies the terminal authentication information (step S106).

Specifically, the authentication information verification processing section 311 compares the obtained (A-2) timestamp with the value obtained by subtracting a prescribed threshold from the last authentication timestamp 303 of the on-board terminal management DB 300. And, if the value obtained by subtracting the threshold from the last authentication timestamp 303 is newer than the (A-2) timestamp, the authentication information verification processing section 311 judges authentication NG because there is a possibility of unauthorized access such as a replay attack (step S107: No), and transmits an authentication information invalid message showing the authentication NG to the communication terminal 20 (step S108). And, the on-board terminal authentication section 211 of the communication terminal 20 transmits its authentication information invalid message to the on-board terminal 10, and terminates the processing (step S109).

On the other hand, if the value obtained by subtracting the threshold from the last authentication timestamp 303 is older than the (A-2) timestamp, the authentication information verification processing section 311 encrypts the terminal authentication information: (A-1) terminal identification information 101 and (A-2) timestamp by the server-side terminal unique key 302 via the cryptographic processing section 314. And, if the encrypted result agrees with the (A-3) encrypted information which is encrypted by the on-board terminal 10, the authentication information verification processing section 311 judges that it is an authentication request from the on-board terminal 10 having the correct terminal unique key 102, and the authentication is passed (authentication OK) (step S107: Yes).

If the encrypted result does not agree with the (A-3) encrypted information which is encrypted by the on-board terminal 10, the authentication information verification processing section 311 determines authentication NG (step S107: No) similar to the judgement using the above-described (A-2) timestamp, proceeds to steps S108 and S109, and terminates the processing.

If the value obtained by subtracting the threshold from the last authentication timestamp 303 is older than the (A-2) timestamp, the authentication information verification processing section 311 may verify the terminal authentication information by comparing information which is obtained by decrypting the (A-3) encrypted information using the server-side terminal unique key 302 via the cryptographic processing section 314 with the (A-1) terminal identification information 101 and the (A-2) timestamp.

And, when the terminal authentication information ("A" information) is a first authentication request from the on-board terminal 10 to the server 30 and information is not stored in the last authentication timestamp 303, the authentication information verification processing section 311 does not compare the (A-2) timestamp with the last authentication timestamp 303, but encrypts the terminal authentication information: (A-1) terminal identification information 101 and (A-2) timestamp by the server-side to final unique key 302, and proceeds to judgement whether or not it agrees with the (A-3) encrypted information.

Subsequently, if the terminal authentication information ("A" information) received in the step S107 is authentication OK, the authentication information management section 312 obtains the current timestamp from the clock section 315 and updates the last authentication timestamp 303 of the on-board terminal management DB 300 (step S110).

Next, the authentication information verification processing section 311 attaches its terminal authentication information to the authentication success message showing the authentication OK of the terminal authentication information ("A" information) and transmits to the communication terminal 20 (step S111).

The on-board terminal authentication section 211 of the communication terminal 20 which has received the authentication success message obtains the terminal authentication information ("A" information) from the authentication success message and stores in the storage section 22 (step S112). And, the on-board terminal authentication section 211 of the communication terminal 20 transmits a terminal authentication completion message showing at the terminal authentication processing has completed to the on-board terminal 10 (step S113).

<Software Acquisition Processing>

Next, software acquisition processing that the communication terminal 20 obtains software conforming to the on-board terminal 10 from the server 30 is described.

Figure 7:
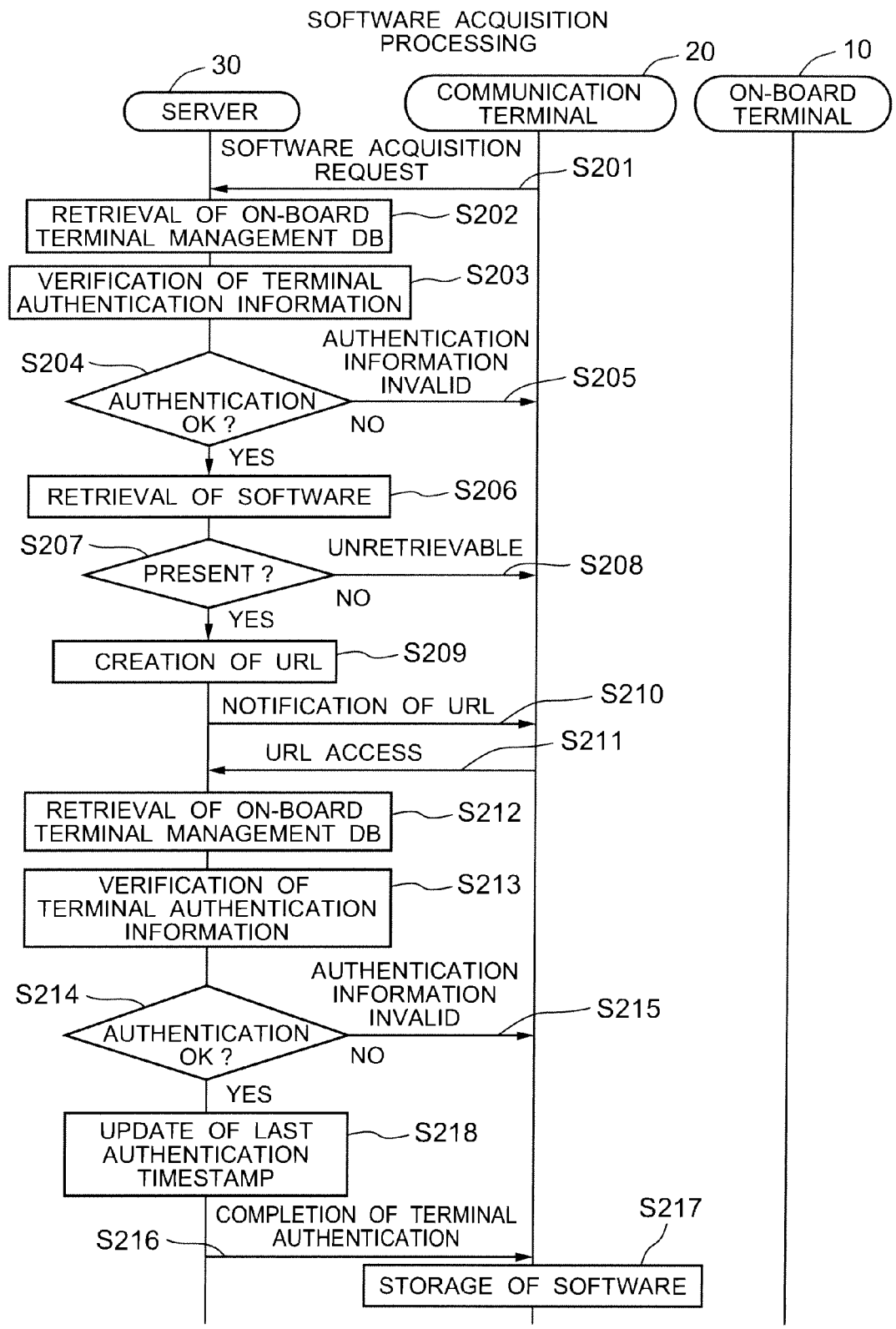
FIG. 7 is a sequence diagram showing a flow of software acquisition processing conducted by the information distribution system a cording to the first embodiment of the invention.

FIG. 7 is a sequence diagram showing a flow of software acquisition processing conducted by the information distribution system 1 according to the first embodiment of the invention.

First, when the start of the software acquisition processing is instructed by the user operation or the like via the input interface 24 of the communication terminal 20, the software acquisition section 212 of the communication terminal 20 generates a software acquisition request message attached with the terminal authentication information ("A" information) stored in the storage section 22 in step S112 in FIG. 6, and transmits to the server 30 (step S201).

Other than the operation by the user, the transmission of the software acquisition request message may be executed when, for example, a software event that the communication terminal 20 needs to obtain software of the on-board terminal 10 is detected.

Next, the authentication information verification processing section 311 of the server 30 obtains the terminal authentication information ("A" information) attached to the software acquisition request message, and performs retrieval of the on-board terminal management DB 300 (step S202), verification of the terminal authentication information (step S203), and judgement of its verification ("authentication OK?") (step S204). Since the processing in the steps S202-S204 is same as in steps S105-S107 of the above-described FIG. 6, its description is omitted.

In step S204, if the terminal authentication information ("A" information) is authentication NG (step S204: No), the authentication information verification processing section 311 transmits an authentication information invalid message showing authentication NO to the communication terminal 20 and terminates the processing as the server 30 (step S205).

Meanwhile, if the terminal authentication information ("A" information) is authentication OK (step S204: Yes), the authentication information verification processing section 311 proceeds to step S206.

In step S206, the software delivery section 317 searches the on-board terminal software DB 310 in the storage section 32 with the (A-1) terminal identification information 101 of the terminal authentication information ("A" information) used as a key and retrieves software conforming to the on-board terminal 10.

As the retrieved result, if there is not software conform to the on-board terminal 10 (step S207: No), the software delivery section 317 transmits to the communication terminal 20 an unretrievable message indicating that the software is unretrievable and terminates the processing as the server 30 (step S208).

On the other hand, if the software delivery section 317 can retrieve the software conforming to the on-board terminal 10, namely, if there is conforming software (step S207: Yes), the software delivery section 317 proceeds to step S209 and continues processing.

In step S209, the software delivery section 317 creates URL for downloading the software which is retrieved by the communication terminal 20 via the HTTP server processing section 316. And, the software delivery section 317 notifies the URL to the communication terminal 20 (step S210). The URL created here includes the software identification information in a style specifiable by the server 30.

The software acquisition section 212 of the communication terminal 20 having received the URL accesses the URL which is a download destination via the HTTP client processing section 215 with the terminal authentication information ("A" information) added (step S211).

Subsequently, the authentication information verification processing section 311 of the server 30 performs retrieval of the on-board terminal management DB 300 for the obtained terminal authentication information ("A" information) (step S212), verification of the terminal authentication information (step S213), and judgement of its verification ("authentication OK?") (step S214). Since the processing in the steps S212-S214 is same as in steps S105-S107 of the above-described FIG. 6, its description is omitted.

In step S214, if terminal authentication information ("A" information) is authentication NG (step S214: No), the authentication information verification processing section 311 transmits an authentication information invalid message showing authentication NG to the communication terminal 20 and terminates the processing as the server 30 (step S215).

Meanwhile, if the terminal authentication information ("A" information) is authentication OK (step S214: Yes), the authentication information management section 312 obtains the current timestamp from the clock section 315, and updates the last authentication timestamp 303 of the on-board terminal management DB 300 (step S218). Subsequently, the software delivery section 317 transmits the encryption software to the communication terminal 20 (step S216). This encryption software is attached with the software identification information to be used by the later-described processing by the software delivery section 317, and transmitted to the communication terminal 20.

And the communication terminal 20 stores the received encryption software into the storage section 22 (step S217).

<Software Unique Key Acquisition Processing>

Next, processing (software unique key acquisition processing) in which the on-board terminal 10 obtains a software unique key via the communication terminal 20 and installs software is described.

Figure 8:
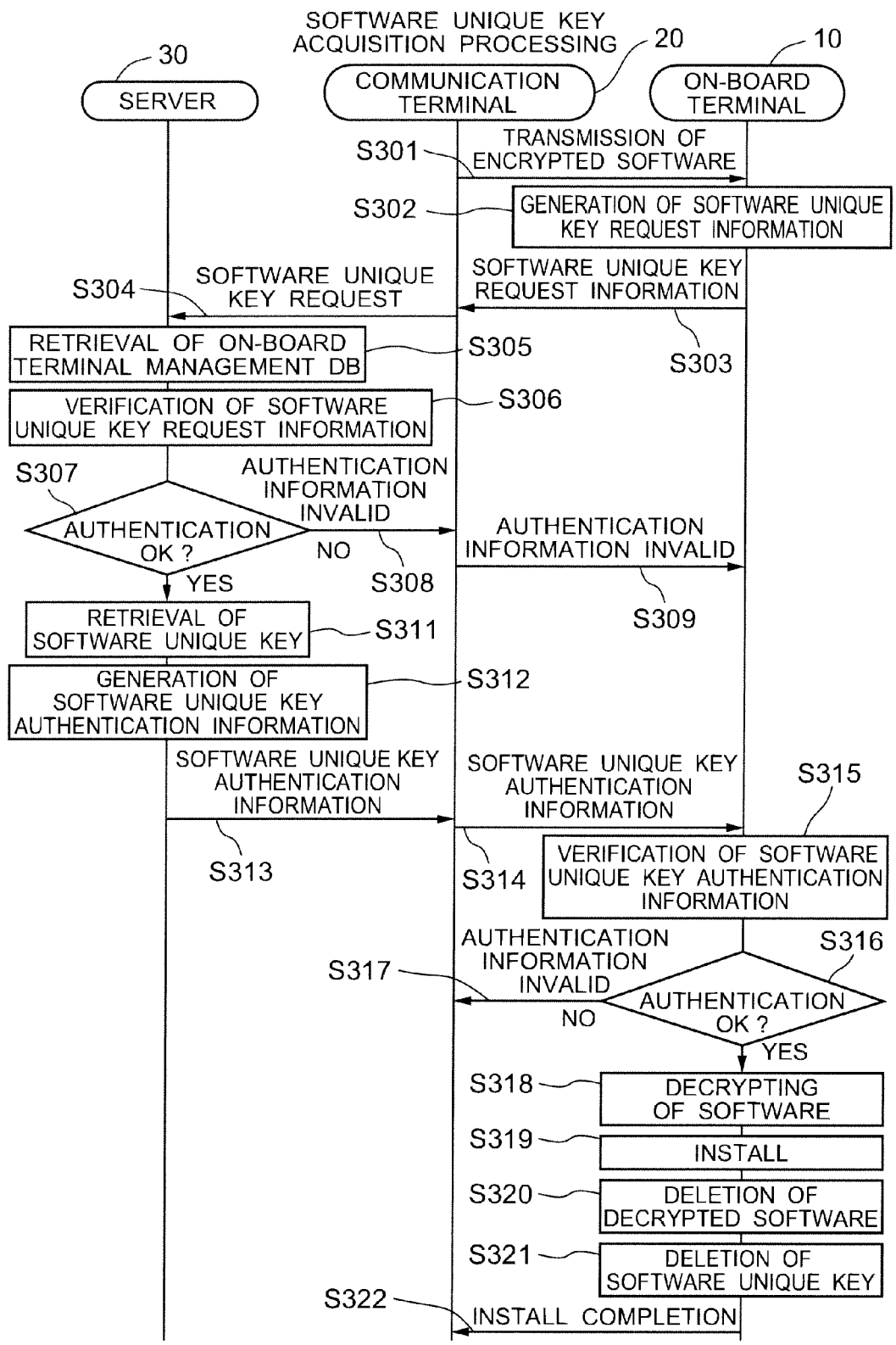
FIG. 8 is a sequence diagram showing a flow of software unique key acquisition processing conducted by the information distribution system according to the first embodiment of the invention.

FIG. 8 is a sequence diagram showing a flow of software unique key acquisition processing performed by the information distribution system 1 according to the first embodiment of the invention.

First, when install of software into the on-board terminal 10 is instructed via the input interface 24 of the communication terminal 20 through the operation by the user, the software transmission section 213 of the communication terminal 20 transmits the encryption software stored in the storage section 22 in step S217 in FIG. 7 to the on-board terminal 10 (step S301).

Other than the operation by the user, the transmission of the encryption software may be executed when for example, a software event which requires the transmission of the encryption software to the on-board terminal 10 of the communication terminal 20 is detected.

Next, the install processing section 113 of the on-board terminal 10 which has received the encryption software stores the encryption software into the storage section 12. And, the authentication information generation section 111 of the on-board terminal 10 generates software unique key request information ("B" information) (step S302).

Specifically, the authentication information generation section 111 obtains the terminal identification information 101 from the storage section 12, obtains the current timestamp from the clock section 115, and obtains the software identification information stored in the storage section 12. And, the authentication information generation section 111 delivers the obtained (B-1) terminal identification information 101, (B-2) timestamp and (B-3) software identification information to the cryptographic processing section 114, and the cryptographic processing section 114 uses the terminal unique key 102 to encrypt the (B-1) terminal identification information 101, the (B-2) timestamp and the (B-3) software identification information, and delivers the encrypted information to the authentication information generation section 111. And, the authentication information generation section 111 generates software unique key request information ("B" information) including (B-1) terminal identification information 101, (B-2) timestamp, (B-3) software identification information, and (B-4) information obtained by encrypting the terminal identification information 101, the timestamp and the software identification information by the terminal unique key 102 (encrypted information).

Subsequently, the install processing section 113 transmits the software unique key request information ("B" information), which is generated by the authentication information generation section 111, to the communication terminal 20 (step S303).

And, the software transmission section 213 of the communication terminal 20 transmits the software unique key request message attached with the received software unique key request information ("B" information) to the server 30 (step S304).

The server 30 retrieves the on-board terminal management DB 300 according to the software unique key request information ("B" information) attached to the software unique key request message which is received from the communication terminal 20 (step S305).

Specifically, the authentication information verification processing section 311 of the server 30 obtains, from the software unique key request information, (B-1) terminal identification information 101, (B-2) timestamp, (B-3) software identification information, and (B-4) information (encrypted information) obtained by encrypting the terminal identification information 101, the timestamp and the software identification information by the terminal unique key 102. And, the authentication information verification processing section 311 retrieves the on-board terminal management DB 300 using, as a key, the (B-1) terminal identification information 101 obtained from the software unique key request information, retrieves the server-side terminal identification information 301 which agrees with the (B-1) terminal identification information 101, and obtains the last authentication timestamp 303.

Next the authentication information verification processing section 311 of the server 30 verifies the software unique key request information (step S306).

Specifically, the authentication information verification processing section 311 compares the obtained (B-2) timestamp with the value obtained by subtracting a prescribed threshold from the last authentication timestamp 303 of the on-board terminal management DB 300. And, if the value obtained by subtracting the threshold from the last authentication timestamp 303 is newer than the (B-2) timestamp, the authentication information verification processing section 311 judges authentication NG because there is a possibility of unauthorized access such as a replay attack (step S307: No) and transmits an authentication information invalid message showing the authentication NG to the communication terminal 20 (step S308). And, the software transmission section 213 of the communication terminal 20 transmits its authentication information invalid message to the on-board terminal 10 and terminates the processing as the communication terminal 20 (step S309).

On the other hand, if the value obtained by subtracting the threshold from the last authentication timestamp 303 is older than the (B-2) timestamp, the authentication information verification processing section 311 encrypts the (B-1) terminal identification information 101 of the software unique key request information, the (B-2) timestamp and the (B-3) software identification information by the server-side terminal unique key 302 via the cryptographic processing section 314. And, if the encrypted result agrees with the (B-4) encrypted information which is encrypted by the on-board terminal 10, the authentication information verification processing section 311 judges that it is an authentication request from the on-board terminal 10 having the correct terminal unique key 102, and the authentication is passed (authentication OK) (step S307: Yes).

And, if the encrypted result does not agree with the (B-4) encrypted information which is encrypted by the on-board terminal 10, the authentication information verification processing section 311 determines authentication NG (step S307: No) similar to the judgement using the above-described (B-2) timestamp, and proceeds to steps S308 and S309, and terminates the processing as the server 30.

If the value obtained by subtracting a threshold from the last authentication timestamp 303 is older than the (B-2) timestamp, the authentication information verification processing section 311 may verify the software unique key request information by comparing information, which is obtained by decrypting the (B-4) encrypted information using the server-side terminal unique key 302 via the cryptographic processing section 314, with the (B-1) terminal identification information 101, the (B-2) timestamp and the (B-3) software identification information.

Next, the software delivery section 317 retrieves the software unique key DB 320 with the (B-3) software identification information of the software unique key request information used as a key, and retrieves the software unique key to be transmitted to the on-board terminal 10 (step S311).

And, the authentication information generation processing section 313 generates software unique key authentication information ("C" information) which is information for transmission of the software unique key from the server 30 to the on-board terminal 10 (step S312).

Specifically, the authentication information generation processing section 313 generates as the software unique key authentication information the (C-1) software identification information, and the (C-2) information (encrypted information) which was obtained by having the software identification information and the software unique key retrieved in step S311 encrypted by the cryptographic processing section 314 using the server-side terminal unique key 302 within the on-board terminal management DB 300. And, the authentication information generation processing section 313 transmits the generated software unique key authentications information ("C" information) to the communication terminal 20 (step S313).

The software transmission section 213 of the communication terminal 20 which has received the software unique key authentication information transmits the software unique key authentication information to the on-board terminal 10 (step S314).

Since the software unique key authentication information is encrypted by the server-side terminal unique key 302 which cannot be known by the communication terminal 20, even if software unique key authentication information could be obtained, the communication terminal 20 and a malicious third party cannot obtain a software unique key contained in it, and it becomes impossible to decrypt the encryption software.

Next, the on-board terminal 10 verifies the software unique key authentication information ("C" information) which is received from the communication terminal 20 (step S315).

Specifically, the authentication information verification section 112 of the on-board terminal 10 decrypts the (C-2) encrypted information of the software unique key authentication information by the terminal unique key 102 stored in its storage section 12, and verifies whether or not the identification information of the decrypted software agrees with the (C-1) software identification information of the software unique key authentication information. And, if they do not agree with each other, the authentication information verification section 112 determines that the software unique key authentication information is altered and judges the authentication as NO (step S316: No), transmits an authentication information invalid message indicating authentication NG to the communication terminal 20, and terminates the processing as the on-board terminal 10 (step S317).

Meanwhile, if they agree with reach other (step S316: Yes), the authentication information verification section 112 determines that the authentication was passed (authentication OK), and uses the software unique key which is simultaneously obtained at the time of decrypting the encryption software stored in the storage section 12 (step S318).

Subsequently, the install processing section 113 installs the software decrypted by the authentication information verification section 112 (step S319). And, when the install completes, the install processing section 113 deletes the decrypted software (step S320) and deletes the software unique key (step S321). It is because when the install completes, the decrypted software and the software unique key are unnecessary, so that hey are deleted from the on-board terminal 10 to reduce the risk of leakage.

And, the install processing section 113 transmits the install completion message to the communication terminal 20 and terminates the processing (step S322).

<Screen Display>

Next, an example of screen transition of the on-board terminal 10 and the communication terminal 20 according to the first embodiment of the invention is described. The screen display of the display 13 controlled by the image processing section 116 of the on-board terminal 10 and the screen display of the display 23 controlled by the image processing section 216 of the communication terminal 20 are described below in correspondence with the above-described (1) terminal authentication processing, (2) software acquisition processing, and 3) software unique key acquisition processing.

(Screen Display by Terminal Authentication Processing)

Figure 9:
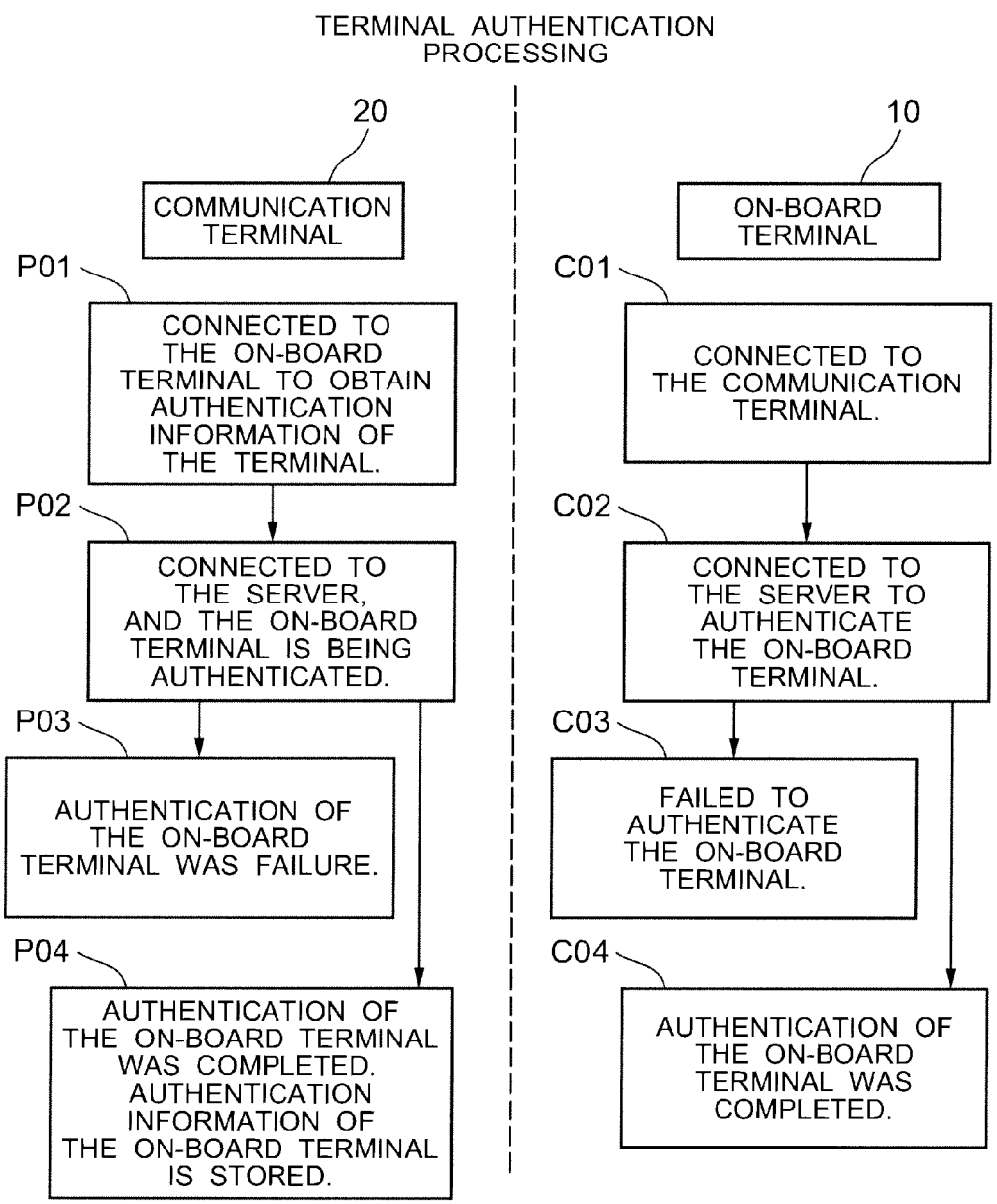
FIG. 9 is a view snowing a screen display example during terminal authentication processing of the on-board terminal and the communication terminal according to the first embodiment of the invention.

FIG. 9 is a view showing an example of screen display during terminal authentication processing of the on-board terminal 10 and the communication terminal 20 according to the first embodiment of the invention.

The image processing section 116 of the on-board terminal 10 and the image processing section 216 of the communication terminal 20 show the screen shown in FIG. 9 during the processing of each step of the terminal authentication processing shown in FIG. 6.

The onboard terminal 10 receives an authentication information request message of step S101 from the communication terminal 20 by the terminal authentication processing in FIG. 6, and shows a screen C01 "Connected to the communication terminal." until step S102 in which terminal authentication information ("A" information) is generated.

Subsequently, the on-board terminal 10 shows a screen C02 "Connected to the server to authenticate the on-board terminal." in and after step S103 in which terminal authentication information is transmitted to the communication terminal 20. And, when authentication information invalid message is received in step S109, the on-board terminal 10 shows a screen C03 "Failed to authenticate the on-board terminal." And, when the on-board terminal 10 receives the terminal authentication completion message of step S113, it shows a screen C04 "Authentication of the on-board terminal was completed.".

On the other hand, the communication terminal 20 shows screen P01 "Connected to the on-board terminal to obtain authentication information of the terminal." from the transmission of an authentication information request message to the on-board terminal 10 in step S101 to the reception of terminal authentication information ("A" information) in step S103 by the terminal authentication information processing in FIG. 6

Subsequently, the communication terminal 20 shows screen P02 "Connected to the server, and the on-board terminal is being authenticated." in and after step S104 where the terminal authentication request message is transmitted to the server 30. And, when the authentication information invalid message is received in step S108, the communication terminal 20 shows screen P03 "Authentication of the on-board terminal was failure.". And, when the authentication success message of step S111 is received, the communication terminal 20 shows screen P04 "Authentication of the on-board terminal was completed. Authentication information of the on-board terminal is stored.".

(Screen Display in Software Acquisition Processing)

Next, the screen display of the communication terminal 20 in the software acquisition processing is described.

Figure 10:
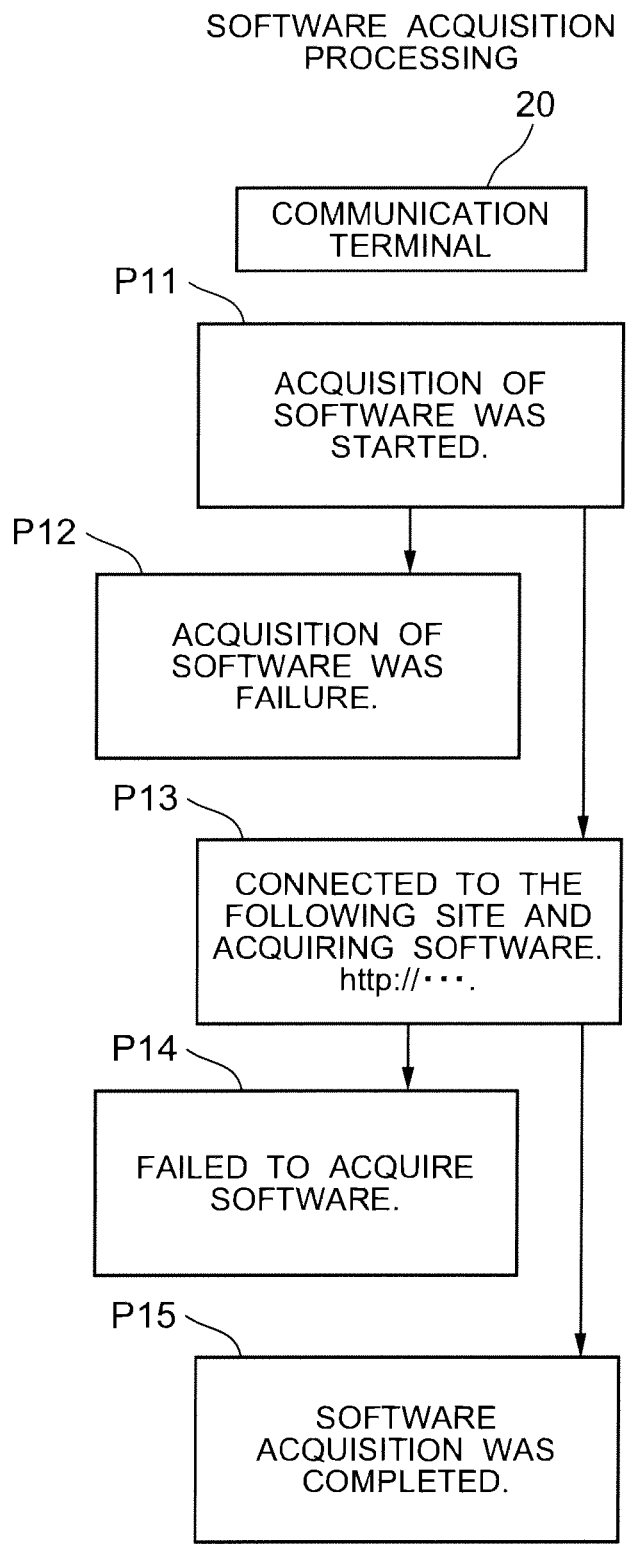
FIG. 10 is a view showing a screen display example during software acquisition processing of the communication terminal according to the first embodiment of the invention.

FIG. 10 is a view showing an example of screen display during the software acquisition processing of the communication terminal 20 according to the first embodiment of the invention.

The image processing section 216 of the communication terminal 20 shows the screen shown in FIG. 10 during the processing of each step of the software acquisition processing shown in FIG. 7.

The communication terminal 20 transmits the software acquisition request message of step S201 in software acquisition processing in FIG. 7 and shows screen P11 "Acquisition of software was started.". And, the communication terminal 20 receives the authentication information invalid message in step S205, receives an unretrievable message in step S208 and shows screen P12 "Acquisition of software was failure.".

Subsequently, the communication terminal 20 receives a URL from the server 30, accesses that URL in step S211, and shows screen P13 "Connected to the following site and obtaining software. http:/// . . . .". And, when the authentication information invalid message of step S215 is received, the communication terminal 20 shows screen P14 "Failed to retrieve software.". And the communication terminal 20 receives encryption software from the server 30 in step S216 stores its encryption software into the storage section 22 in step S217, and shows screen P15 "Software acquisition was completed.".

(Screen Display of Software Unique Key Acquisition Processing)

Next, screen displays of the on-board terminal 10 and the communication terminal 20 during software unique key acquisition processing are described.

Figure 11:
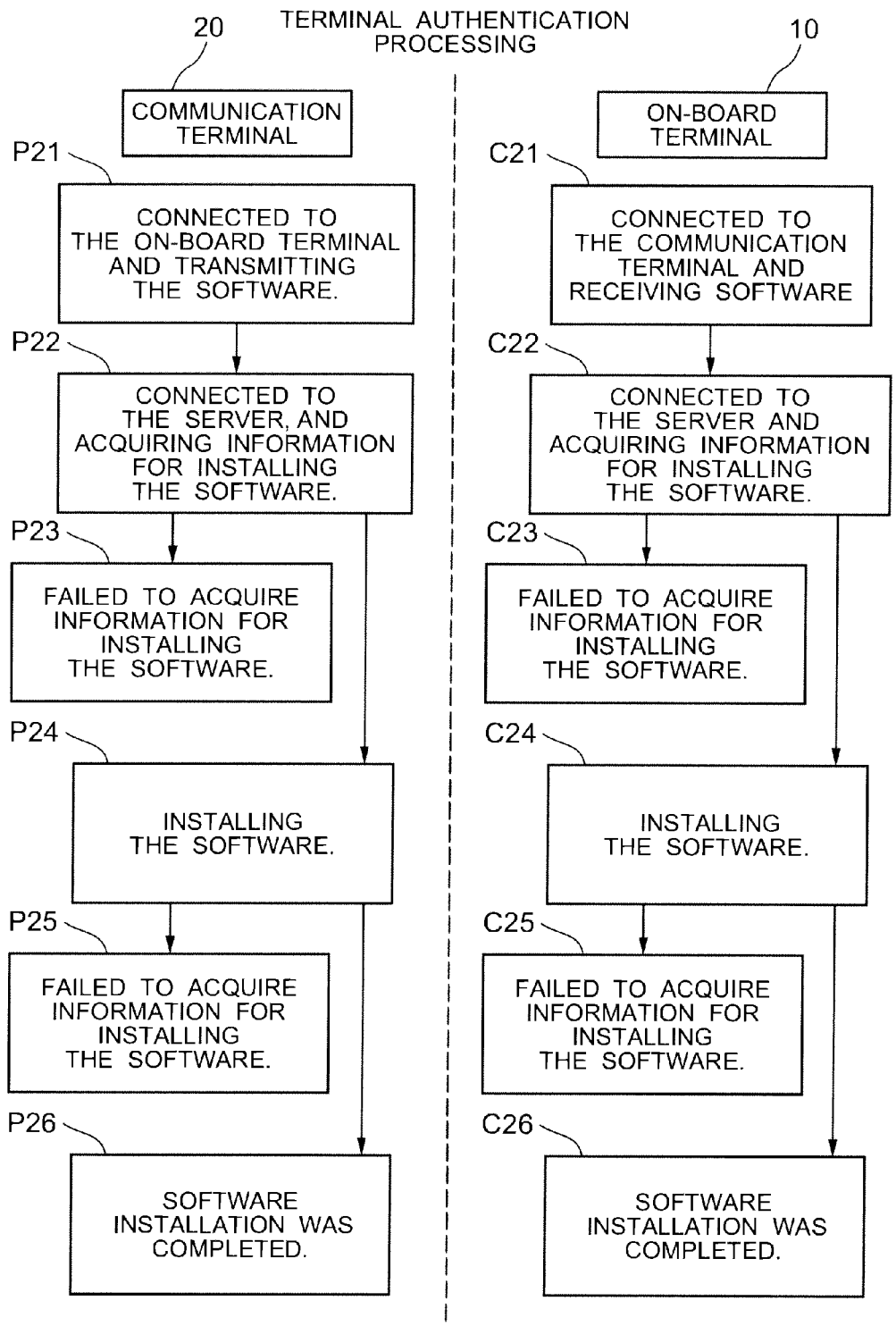
FIG. 11 is a view showing a screen display example during software unique key acquisition processing of the on-board terminal and the communication terminal according to the first embodiment of the invention.

FIG. 11 is a view showing an example of screen displays during software unique key acquisition processing of the on-board terminal 10 and the communication terminal 20 according to the first embodiment of the invention.

The image processing section 116 of the on-board terminal 10 and the image processing section 216 of the communication terminal 20 show the screens shown in FIG. 11 during processing in each step of the software unique key acquisition processing shown in FIG. 8.

In the software unique key acquisition processing in FIG. 8, the on-board terminal 10 receives encryption software from the communication terminal 20 in step S301 and shows screen C21 "Connected to the communication terminal and receiving software.". The on-board terminal 10 transmits software unique key request information ("B" information) of step S303 to the communication terminal 20 and shows screen C22 "Connected to the server and obtaining information for installing the software.". If an authentication information invalid message is received in step S309, the on-board terminal 10 shows screen C23 "Failed to obtain information for installing the software.".

When software unique key authentication information ("C" information) is received in step S314, the on-board terminal 10 shows screen C24 "Installing the software.". If it was authentication NG when the software unique key authentication information was verified (step S316: No), the on-board terminal 10 shows screen C25 "Failed to obtain information for installing the software.". On the other hand, if it was authentication OK when the software unique key authentication information was verified (step S316: Yes) and software installation step S319) is completed, the on-board terminal 10 shows screen C26 "Software installation completed.".

On the other hand, in the software unique key acquisition processing in FIG. 8, the communication terminal 20 shows screen P21 "Connected to the on-board terminal and transmitting the software." from the transmission of encryption software to the on-board terminal 10 in step S301 to the reception of software unique key request information ("B" information step S303.

Subsequently, the communication terminal 20 shows screen P22 "Connected to the server, and obtaining information for installing the software." from and after step S304 to transmit the software unique key request message to the server 30. And, when the authentication information invalid message was received in step S308, the communication terminal 20 shows screen P23 "Failed to obtain information for installing the software.". When the software unique key authentication information ("C" information) was received in step S313 and the software unique key authentication information was transmitted to the on-board terminal 10 (step S314), the communication terminal 20 shows screen P24 "Installing the software.".

And, when the authentication information invalid message was received in step S317, the communication terminal 20 shows screen P25 "Failed to obtain information for installing the software.". On the other hand, when an install completion message is received (step S322), the communication terminal 20 shows screen P26 "Software installation was completed.".

An example of screen transition of each processing content was described above, but the on-board terminal 10 may provide the processing content shown on the screen to the user as voice information via a speaker 15 by the voice processing section 118. And, the communication terminal 20 may also provide the processing content shown on the screen to the user as voice information via the speaker 25 by the voice processing section 218.

As described above, when it is configured that the on-board terminal and the server only can generate the terminal authentication information and the software unique key request information using the terminal unique key according to the first embodiment of the invention, it is possible to prevent unauthorized acquisition of software by spoofing a regular on-board terminal. And, the terminal identification information ("A information") held by the communication terminal contains timestamp, so that it has a different value every time the on-board terminal and the communication terminal are connected, namely its use is limited to one time, and the expiration date of the terminal identification information using the threshold is managed by the server. Thus, even if the terminal identification information is obtained without authorization, the terminal identification information obtained without authorization can be invalidated when the threshold period elapses. In addition, unauthorized use of software such as copying and distributing of software by unauthorized means can be prevented by the expiration date management which has as the starting point the software delivery timestamp and the encryption of a software unique key by a terminal unique key.

Second Embodiment

Next, the information distribution system 1 according to a second embodiment of the invention is described. The information distribution system 1 according to the second embodiment of the invention is an example that the communication terminal 20 obtains terminal authentication information ("A" information) from the on-board terminal 10 and stores it by the terminal authentication processing in the first embodiment of the invention.

The overall configuration of the information distribution system 1 according to the second embodiment of the invention is same as the information distribution system 1 according to the first embodiment of the invention shown in FIG. 1.

And, the configuration of each device of the information distribution system 1 according to the second embodiment of the invention is similar to the configuration of each device of the first embodiment of the invention shown in FIG. 2 to FIG. 4. But, in addition to the functions shown in the first embodiment, the on-board terminal authentication section 211 (see FIG. 3) of the communication terminal 20 is provided with the following functions.

Figure 12:
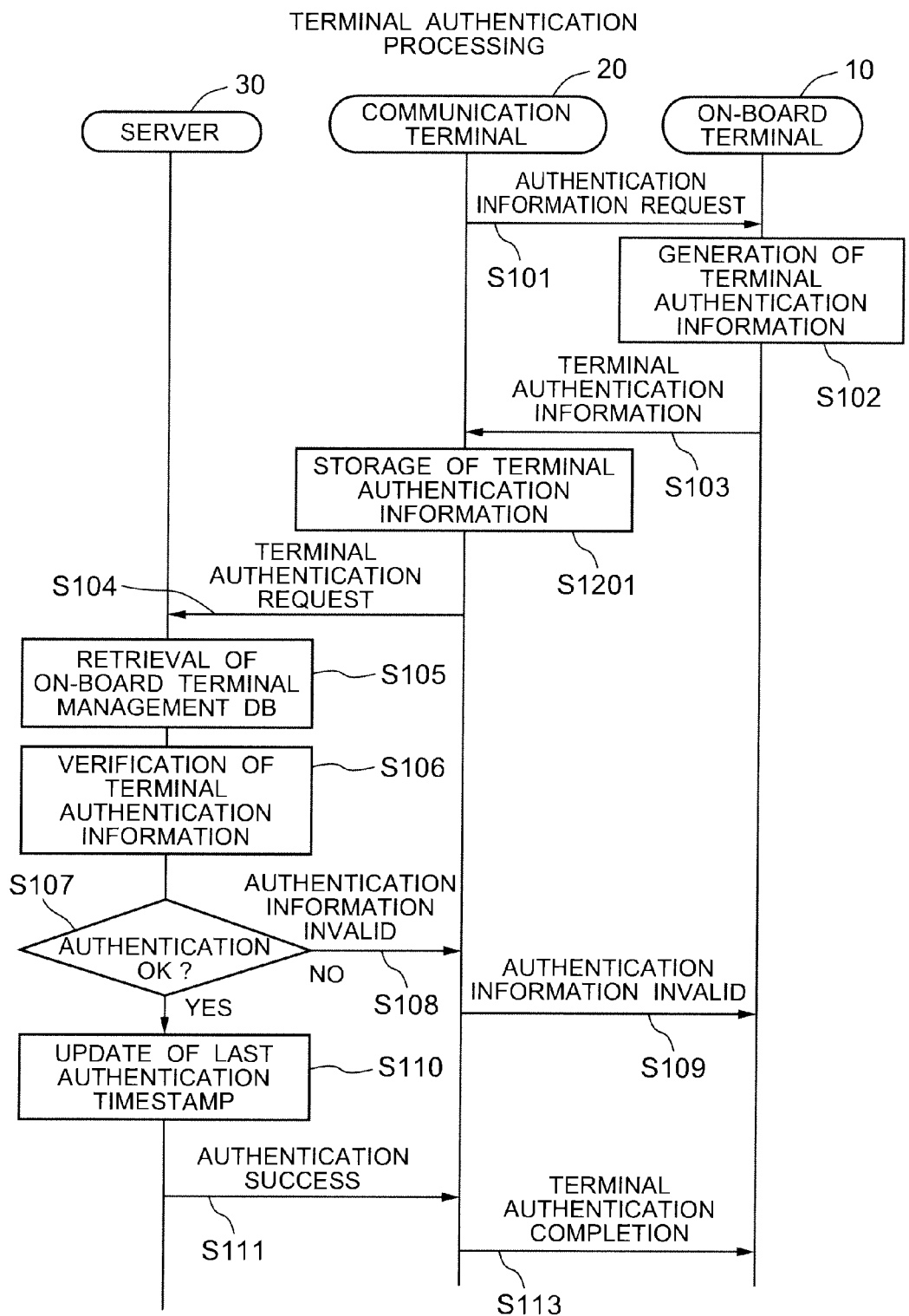
FIG. 12 is a sequence diagram showing a flow of terminal authentication processing conducted by the information distribution system according to a second embodiment of the invention.

The on-board terminal authentication section 211 of the communication terminal 20 obtains the terminal authentication information ("A" information) from the terminal authentication request message attached with the terminal authentication information ("A" information) received from the on-board terminal 10 and stores in the storage section 22 of the communication terminal 20 (step S1201 in FIG. 12).

And, the authentication information verification processing section of the server 30 (see FIG. 4) has the following functions different from those in the first embodiment.

The authentication information verification processing section 311 of the server 30 transmits an authentication success message showing authentication OK of terminal authentication information ("A" information) to the communication terminal 20. At this time, the terminal authentication information ("A" information) is not attached (step S111 in FIG. 12).

As described above, according to the second embodiment of the invention, in a case where the communication terminal within a vehicle, which is parked in an underground parking lot, cannot be connected to a communication network such as a mobile communication network, it becomes possible that the terminal authentication information is authenticated by the server when the terminal authentication information can be stored in the communication terminal and the communication terminal is in a state connectable to the communication network outside the vehicle.

Third Embodiment

Next, an information distribution system 1 according to a third embodiment of the invention is described. The information distribution system 1 according to the third embodiment of the invention is an example that a timestamp which becomes a start point of expiration date management of software in the first embodiment or the second embodiment of the invention is determined as a point of time when software is installed.

As a prerequisite of the processing performed by the information distribution system 1 according to the third embodiment of the invention, the terminal authentication processing in FIG. 6 and the software acquisition processing in FIG. 7 in the first embodiment or the second embodiment of the invention are being performed, and they are being performed also using the terminal authentication information ("A" information) of a first on-board terminal 10.

An overall configuration of the information distribution system 1 according to the third embodiment of the invention is similar to the information distribution system 1 according to the first embodiment or the second embodiment of the invention shown in FIG. 1.

And, the configuration of each device of the information distribution system 1 according to the third embodiment of the invention is similar to the configuration of each device according to the first embodiment or the second embodiment of the invention shown in FIG. 2 to FIG. 4. But, the authentication information management section 312 (see FIG. 4) of the server 30 is provided with the following functions in addition to the functions in the first embodiment or the second embodiment.

Figure 13:
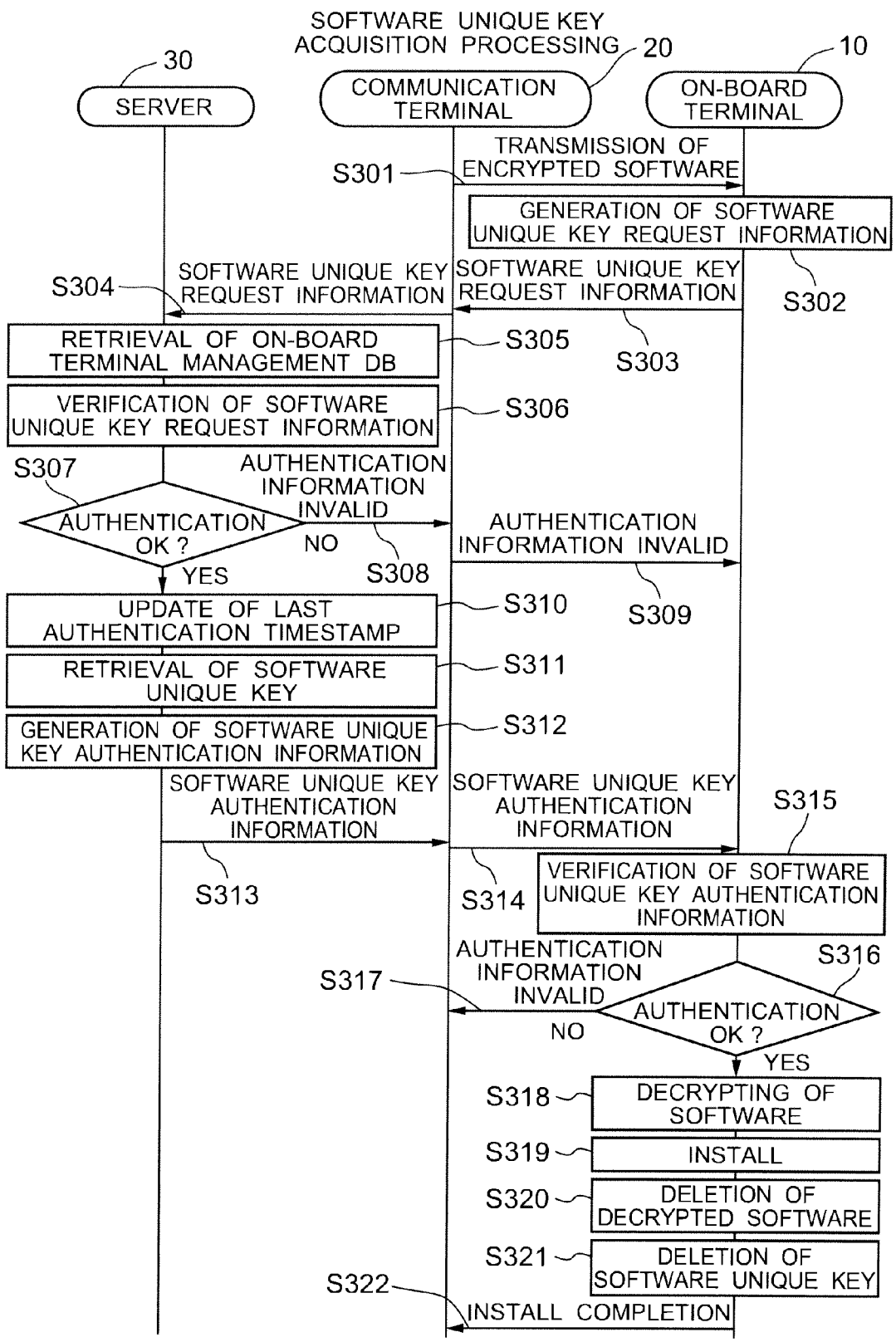
FIG. 13 is a sequence diagram showing a flow of software unique key acquisition processing conducted by an information distribution system according to a third embodiment of the invention.

If the received software unique key request information ("B" information) is authentication OK in step S307, the authentication information management section 312 of the server 30 obtains current timestamp from the clock section 315 and updates the last authentication timestamp 303 of the on-board terminal management DB 300 (step S310 in FIG. 13).

As described above, according to the third embodiment of the invention, when the timestamp when the terminal authentication information described in the first embodiment was authenticated is determined as the starting point by the expiration date management which has as the starting point the timestamp when authentication of the software unique key request information is success and is just before the installation of software, a flexible operation of software delivery is made possible by providing selection of timestamp which becomes the starting point of the expiration date management optimum for the software from three points of time including the software delivered timestamp determined as the starting point.

Fourth Embodiment

Next, the information distribution system 1 according to the fourth embodiment of the invention is described. The information distribution system 1 according to the fourth embodiment of the invention is an example of managing the expiration date of each piece of software in the first embodiment or the third embodiment of the invention.

The overall configuration of the information distribution system 1 according to the fourth embodiment of the invention is similar to the information distribution system 1 according to the first embodiment shown in FIG. 1 or the third embodiment of the invention.

And, the configuration of each device of the information distribution system 1 according to the fourth embodiment of the invention is similar to the configuration of each device according to the first embodiment or the third embodiment of the invention shown in FIG. 2 to FIG. 4. But, the authentication information management section 312 of the server 30 (see FIG. 4) is provided with the following functions in addition to the functions in the first embodiment or the third embodiment.

The authentication information management section 312 of the server 30 uses information stored in the on-board terminal software management DB 330 for verification of terminal authentication information ("A" information) or software unique key request information ("B" information).

FIG. 14 is a view describing a structure of data stored in the on-board terminal software management DB 330 according to the fourth embodiment of the invention.

As shown in FIG. 14, the on-board terminal software management DB 330 stores server-side terminal identification information 331, software identification information 332, expiration date starting point 333, expiration date threshold 334, software obtainable frequency 315, software unique key obtainable frequency 336 and last authentication timestamp 337.

The server-side terminal identification information 331 is same as the server-side terminal identification information 301 described with reference to FIG. 5. The software identification information 332 stores software identification information which can be used by the on-board terminal having the identification information stored in the server-side terminal identification information 331.

The expiration date starting point 333 stores processing which becomes a starting point when the expiration date of software is checked. In this embodiment, three types "time of authentication information generation", "time of software delivery" and "time of unique key delivery" are stored.

The "time of authentication information generation" shows timestamp which is judged authentication OK when the terminal authentication information was verified by the terminal authentication processing (step S110 in FIG. 6 or step S110 in FIG. 12). The "time of software delivery" shows timestamp which is judged authentication OK when the terminal authentication information was verified by software acquisition processing (step S218 in FIG. 7). The "time of unique key delivery" shows timestamp which is judged authentication OK when software unique key request information was verified by software unique key acquisition processing (step S310 in FIG. 13).

The expiration date threshold 334 stores a threshold used when terminal authentication information is verified by terminal authentication processing dust before the software deliver processing (step S213 in FIG. 7) and when software unique key request information is verified by the software unique key acquisition processing (step S306 in FIG. 13). When the expiration date starting point 333 is the "time of authentication information generation", the threshold has a particular value as the information distribution system 1, and the expiration date threshold 334 does not store the value.

The software obtainable frequency 335 stores an obtainable frequency of software having identification information stored in the software identification information 332 by the on-board terminal having identification information stored in the server-side terminal identification information 331. When the software obtaining frequency is not limited, "Unlimited" is stored. In a case where software cannot be obtained, "0" is stored.

The software unique key obtainable frequency of software having identification information stored in the software identification information 332 is stored in the software unique key obtainable frequency 336 by the on-board terminal having the identification information stored in the server-side terminal identification information 331. When the software unique key obtaining frequency is not limited, "Unlimited" is stored. In a case where a software unique key cannot be obtained, "O" is stored.

The last authentication timestamp 337 stores the last authentication timestamp when the expiration date starting point 333 is at the "time of software delivery" or "time of unique key delivery.". The last authentication timestamp when the expiration date starting point 333 is at the "time of authentication information generation" is stored in the last authentication timestamp 303 of the on-board terminal management DB 300 because it is processing irrelevant to software management such as software acquisition or software unique key acquisition.

The value to be stored in the expiration date starting paint 333, the expiration date threshold 334, the software obtainable frequency 335 and the software unique key obtainable frequency 336 may be different or common for each piece of software. And, it may also be different or common for every on-board terminal.

Subsequently, the processing by the authentication information management section 312 of the server 30 is described. The terminal authentication processing by the authentication information management section 312 is similar to the terminal authentication processing in the first embodiment or the third embodiment shown in FIG. 6 or FIG. 12.

In the software acquisition processing by the authentication information management section 312, the onboard terminal software management DB 330 is referenced when terminal authentication information is verified in step S213 in FIG. 7. At this time, the on-board terminal software management DB 330 is retrieved using (A-1) terminal identification information 101 of the onboard terminal 10 attached to the terminal authentication information ("A" information) and the software identification information attached to a URL access (step S211 in FIG. 7) of the communication terminal 20 as keys to specify the expiration date starting point 333, the expiration date threshold 334, the software obtainable frequency 335, the software unique key obtainable frequency 336 and the last authentication timestamp 337.

If the software obtainable frequency 335 is 0, it is judged authentication NG, and an authentication information invalid message indicating authentication NG is transmitted to the communication terminal 20 (step S215 in FIG. 7).

When the software obtainable frequency 335 is other than 0 and the expiration date starting point 333 is "time of authentication information generation" or "time of unique key deliver", the terminal authentication information is verified by the methods described in the first embodiment to the third embodiment.

When the software obtainable frequency 335 is other than 0 and the expiration date starring point 333 is "time of software delivery", the value stored in the expiration date threshold 334 is used as a threshold, and the timestamp stored in the last authentication timestamp 337 is used to verify the authentication information.

Specifically, the authentication information verification processing section 31 obtains the values stored in the expiration date threshold 334 and the last authentication timestamp 337 by the authentication information management section 312 and compares the value of the last authentication timestamp 337 with the value obtained by subtracting the value of the expiration date threshold 334 from the current timestamp obtained from the clock section 315. And, if the value obtained by subtracting the value of the expiration date threshold 334 from the current timestamp obtained from the clock section 315 is newer than the value of the last authentication timestamp 337, the authentication information verification processing section 311 judges authentication NG due to expiration of the expiration date (step S214: No in FIG. 7) and transmits an authentication information invalid message showing authentication NG to the communication terminal 20 (step S215 in FIG. 7).

On the other hand, if the value obtained by subtracting the value of the expiration date threshold 334 from the current timestamp obtained from the clock section 315 is older than the value of the last authentication timestamp 337, the authentication information verification processing section 311 encrypts the (A-1) terminal identification information 101 and the (A-2) timestamp of the software unique key request information via the cryptographic processing section 314 using the server-side terminal unique key 302. And, if the encrypted result agrees with the (A-3) encrypted information which is encrypted by the on-board terminal 10, the authentication information verification processing section 311 judges as an authentication request from the on-board terminal 10 having the correct terminal unique key 102, and the authentication is passed (authentication OK) (step S214: Yes in FIG. 7).

If the encrypted result does not agree with the (A-3) encrypted information which is encrypted by the on-board terminal 10, the authentication information verification processing section 311 determines authentication NG (step S214: No in FIG. 7) similar to the judgement using the above-described (A-2) timestamp, proceeds to step S215 in FIG. 7 and terminates the processing.

If the value obtained by subtracting the value of the expiration date threshold 334 from the current timestamp obtained from the clock section 315 is older than the value of the last authentication timestamp 337, the authentication information verification processing section 311 may verify the terminal authentication information by comparing information, which is obtained by decrypting the (A-3) encrypted information using the server-side terminal unique key 302 via the cryptographic processing section 314, with the (A-1) terminal identification information 101 and the (A-2) timestamp.

And, if information is not stored in the last authentication timestamp 337, the value of the last authentication timestamp 337 is not compared with the value obtained by subtracting the value of the expiration date threshold 334 from the current timestamp obtained from the clock section 315, and the terminal authentication information is verified.

In addition, if the expiration date starting point 333 of the on-board terminal software management DB 330 is "time of software delivery," the authentication information management section 312 stores the current timestamp obtained from the clock section 315 into the last authentication timestamp 337 of the on-board terminal software management DB 330 in step S218 in FIG. 7. Subsequently, when processing of storing the software by the communication terminal 20 in step S217 in FIG. 7 is completed, storage is made after subtracting 1 from the software obtainable frequency 335 of the on-board terminal software management DB 330. If the software obtainable frequency is unlimited, the above subtraction is not performed.

In the software unique key acquisition processing by the authentication information management section 312, the on-board terminal software management DB 330 is referenced when software unique key request information is verified in step S306 in FIG. 13. At this time, the on-board terminal software management DB 330 is retrieved using the (B-1) terminal identification information 101 and the (B-3) software identification information of the on-board terminal 10 attached to the software unique key request information ("B" information) as a key to specify the expiration date starting point 333, the expiration date threshold 334, the software obtainable frequency 335, the software unique key obtainable frequency 336 and the last authentication timestamp 337.

If the software unique key obtainable frequency 336 is 0, it is judged authentication NG, and an authentication information invalid message indicating the authentication NG is transmitted to the communication terminal 20 (step S308 in FIG. 13). And, the software transmission section 213 of the communication terminal 20 transmits its authentication information invalid message to the on-board terminal 10 and terminates the processing as the communication terminal 20 (step S309 in FIG. 13).

If the software unique key obtainable frequency 336 is other than 0 and the expiration date starting point 333 is "time of authentication information generation", the terminal authentication information is verified by the methods described in the first embodiment to the third embodiment.

If the software unique key obtainable frequency 336 is other than 0 and the expiration date starting point 333 is "time of software delivery" or "time of unique key delivery", the value stored in the expiration date threshold 334 is used as a threshold, and the timestamp stored in the last authentication timestamp 337 is used to verify the authentication information.

Specifically, the authentication information verification processing section 311 obtains the values stored in the expiration date threshold 334 and the last authentication timestamp 337 from the authentication information management section 312, and compares the value of the last authentication timestamp 337 with the value obtained by subtracting the value of the expiration date threshold 334 from the current timestamp obtained from the clock section 315. And, if the value obtained by subtracting the value of the expiration date threshold 334 from the current timestamp obtained from the clock section 315 is newer than the value of the last authentication timestamp 337, the authentication information verification processing section 311 judges authentication NG due to expiration of the expiration date (step S307: No), and transmits an authentication information invalid message showing the authentication NG to the communication terminal 20 (step S308). And the software transmission section 213 of the communication terminal 20 transmits its authentication information invalid message to the on-board terminal 10, and terminates the processing as the communication terminal 20 (step S309).

On the other hand, if the value obtained by subtracting the value of the expiration date threshold 334 from the current timestamp obtained from the clock section 315 is older than the value of the last authentication timestamp 337, the authentication information verification processing section 311 encrypts the (B-1) terminal identification information 101, the (B-2) timestamp and the (B-3) software identification information of the software unique key request information using the server-side terminal unique key 302 via the cryptographic processing section 314. And, if the encrypted result agrees with the (B-4) encrypted information which is encrypted by the on-board terminal 10, the authentication information verification processing section 311 judges as an authentication request from the on-board terminal 10 having a correct terminal unique key 102, and the authentication is passed (authentication OK) (step S307: Yes).

And if the encrypted result does not agree with the (B-4) encrypted information which is encrypted by the on-board terminal 10, the authentication information verification processing section 311 determines authentication NG (step S307: No), proceeds to steps S308 and S309 and terminates the processing as the server 30.

If the value obtained by subtracting a threshold from the last authentication timestamp 303 is older than the (B-2) timestamp, the authentication information verification processing section 311 may verify the software unique key request information by comparing information, which is obtained by decrypting the (B-4) encrypted information using the server-side terminal unique key 302 via the cryptographic processing section 314, with the (B-1) terminal identification information 101, the (B-2) timestamp and the (B-3) software identification information.

And, if information is not stored in the last authentication timestamp 337, software unique key request information is verified without comparing the value of the last authentication timestamp 337 with the value obtained by subtracting the value of the expiration date threshold 334 from the current timestamp obtained from the clock section 315.

In addition, if the expiration date starting point 333 of the on-board terminal software management DB 330 is "time of unique key delivery", the authentication information management section 312 stores the current timestamp obtained from the clock section 315 into the last authentication timestamp 337 of the on-board terminal software management DB 330 in step S310 in FIG. 13. Subsequently, when transmission of software unique key authentication information to the on-board terminal 10 in step S314 in FIG. 13 is completed, storage is made after subtracting 1 from the software unique key obtainable frequency 336 of the on-board terminal software management DB 330. If the software obtainable frequency is unlimited, the subtraction is not performed.

As described above, according to the fourth embodiment of the invention, the expiration date management of each piece of software is realized, and unauthorized use of software can be prevented.

Fifth Embodiment

Next, the information distribution system 1 according to a fifth embodiment of the invention is described. The information distribution system 1 according to the fifth embodiment of the invention is an example that software which is purchased by the user and can be executed by the on-board terminal is added and software which can be executed by the on-board terminal is deleted because its service is stopped in the fourth embodiment of the invention.

The information distribution system 1 according to the fifth embodiment of the invention has an overall configuration which is similar to that of the information distribution system 1 according to the fourth embodiment of the invention shown in FIG. 1.

And, the individual devices in the information distribution system 1 according to the fifth embodiment of the invention have the same structures as those of individual devices according to the fourth embodiment of the invention shown in FIG. 2 to FIG. 4.

Addition and deletion of software executable by the on-board terminal according to the fifth embodiment of the invention are executed by the user management section 318 of the server 30. The user management section 318 manages the user management DB 340. FIG. 15 is a view explaining a structure of data to be stored in the user management DB 340.

As shown in FIG. 15, the user management DB 340 stores a user identification information 341, a user password 342, and possessed terminal identification information A to C (343 to 345).

The user identification information 341 and the user password 342 are information for uniquely specifying the user. The possessed terminal identification information A to C (343 to 345) store the terminal identification information 101 of the same value as the on-board terminal 10 possessed by the user identified by the user identification information 341.

When software usable by the on-board terminal 10 is purchased by a user and added, the user management section 318 refers to the user management DB 340 to obtain the possessed terminal identification information A to C (343 to 345) and specifies the on-board terminal usable by the user. Subsequently, for the on-board terminal software management DB 330, a set of the on-board terminal identification information usable by the user and the identification information on software to be added is stored as a new attribute into the server-side terminal identification information 331 and the software identification information 332. And, the expiration date starting point 333, the expiration date threshold 334, the software obtainable frequency 335 and the software unique key obtainable frequency 336 which are specified by the software identification information are stored together.

If it was found by checking the possessed terminal identification information A to C (343 to 345) that the user has a plurality of on-board terminals, attributes for the possessed on-board terminal identification information may be added or attributes for particular on-board terminal identification information only may be added.

And, when the user obtains software by buying or the like, 0 is stored in the software obtainable frequency 335 within the on-board terminal software management DB 330 and 0 is stored in software in an unobtainable state and the software unique key obtainable frequency 336, and the user management section 318 changes software, which is in a state uninstallable into the on-board terminal 10, into a usable state.

In this case, similar to the case that software usable by the on-board terminal 10 is added, the possessed terminal identification information A to C (343 to 345) is obtained with reference to the user management DB 340, and the user usable on-board terminal is specified. Subsequently, for the on-board terminal software management DB 330, a set of the user usable on-board terminal identification information and identification information of software to be added is stored as a new attribute into the server-side terminal identification information 331 and the software identification information 332. And, the value of the software obtainable frequency 335 or the software unique key obtainable frequency 336 is changed depending on the content additionally acquired.

When the software usable by the on-board terminal 10 is deleted due to some reason such as a delivery stop of software itself or abolition of service, the user management section 318 retrieves and deletes the software to be deleted using as a key the set of the server-side terminal identification information 331 and the software identification information 332 or the software identification information 332 only.

When the on-board terminal 10 becomes unusable because of its disposal or the like, the user management section 318 retrieves and deletes the on-board terminal to be deleted using the server-side terminal identification information 331 as a key. In addition, the identification information of the on-board terminal stored in the terminal identification information A to C (343 to 345) possessed by the user management DB 340 is also deleted.

As described above, according to the fifth embodiment of the invention, the software purchased by the user and executable by the on-board terminal can be added and the software executable by the on-board terminal can be deleted because its service is stopped.

Sixth Embodiment

Next, the information distribution system 1 according to a sixth embodiment of the invention is described. The information distribution system 1 according to the sixth embodiment of the invention is an example that terminal identification information and software unique key request information are generated using a random number in the first embodiment to the fifth embodiment of the invention.

The information distribution system 1 according to the sixth embodiment of the invention has an overall configuration which is similar to that of the information distribution system 1 according to the first embodiment to the fifth embodiment of the invention shown in FIG. 1.

And, the individual devices in the information distribution system 1 according to the sixth embodiment of the invention have the same structures as those of the individual devices according to the first embodiment to the fifth embodiment of the invention shown in FIG. 2 to FIG. 4. But, differences in functions of the authentication information generation section 111 of the on-board terminal 10 (see FIG. 2) from the first embodiment to the fifth embodiment are described below.

The authentication information generation section 111 of the on-board terminal 10 according to the sixth embodiment of the invention uses a random number when terminal authentication information and software unique key request information used for installation of the software from the server 30 are generated.

Specifically, the authentication information generation section 111 generates, as terminal authentication information (hereinafter call as "Aa" information), information including:

(Aa-1) later-described terminal identification information 101 within the storage section 12, (Aa-2) a random number which is obtained from the random number generation section 119, and (Aa-3) information (encrypted information) obtained by encrypting the terminal identification information 101 and the random number by the cryptographic processing section 114 using the terminal unique key 102 in the storage section 12.

And, the authentication formation generation section 111 generates, as software unique key request information (hereinafter called "Ba" information), information including:

(Ba-1) the later-described terminal identification information 101 within the storage section 12, (Ba-2) the random number which is obtained from the random number generation section 119, (Ba-3) software identification information obtained from the server 30 via the communication terminal 20, and (Ba-4) information (encrypted information) obtained by encrypting the terminal identification information 101, the random number and the software identification information by the cryptographic processing section 114 using the terminal unique key 102 in the storage section 12.

Verification processing of terminal authentication information ("Aa" information) by the authentication information verification processing section 311 of the server 30 is as follows. The authentication information verification processing section 311 receives from the communication terminal 20 a terminal authentication request message attached with terminal authentication information ("Aa" information) (step S105 in FIG. 6 and step S105 in FIG. 12), and obtains, from the terminal authentication information, (Aa-1) terminal identification information 101, (Aa-2) a random number, and (Aa-3) information (encrypted information) obtained by encrypting the terminal identification information 101 and the random number using the terminal unique key 102. And, the authentication information verification processing section 311 retrieves the on-board terminal management DB 300 in the storage section 32 rising the (Aa-1) terminal identification information 101 obtained as a key from the terminal authentication information. Specifically, first, the authentication information verification processing section 311 retrieves the server-side terminal identification information 301 which agrees with the (Aa-1) terminal identification information 101, and obtains its last authentication timestamp 303.

Next, the authentication information verification processing section 311 compares the last authentication timestamp 303 with the value obtained by subtracting a prescribed threshold from the current timestamp obtained from the clock section 315. And, if the value obtained by subtracting a prescribed threshold from the current timestamp obtained from the clock section 315 is newer than the last authentication timestamp 303, the authentication information verification processing section 311 determines authentication NG and terminates the processing. On the other hand, if the value obtained by subtracting the prescribed threshold from the current timestamp obtained from the clock section 315 is older than the last authentication timestamp 303, the authentication information verification processing section 311 encrypts the (Aa-1) terminal identification information 101 and the (Aa-2) random number of the terminal authentication information using the server-side terminal unique key 302 via the cryptographic processing section 314. And, if the encrypted result agrees with the (Aa-3) encrypted information which is encrypted by the on-board terminal 10, the authentication information verification processing section 311 judges as an authentication request from the on-board terminal 10 having the correct terminal unique key 102, and the authentication is passed (authentication OK).

And, in the above processing in which the value obtained by subtracting the prescribed threshold from the current timestamp obtained from the clock section 315 is older than the last authentication timestamp 303, if information obtained by decrypting the (Aa-3) encrypted information by the cryptographic processing section 314 using the server-side terminal unique key 302 agrees with the (Aa-1) terminal identification information 101 and the (Aa-2) random number, it is judged as an authentication request from the on-board terminal 10 having the correct terminal unique key 102, and the authentication may be passed (authentication OK).

If the terminal authentication information ("Aa" information) is a first authentication request from the on-board terminal 10 to the server 30, and information is not stored in the last authentication timestamp 303, the authentication information verification processing section 311 does not compare the current timestamp obtained from the clock section 315 with the last authentication timestamp 303, encrypts the (Aa-1) terminal identification information 101 of the terminal authentication information and the (Aa-2) random number using the server-side terminal unique key 302, and judges whether or not it agrees with the (Aa-3) encrypted information.

And, the same processing as above is performed in the verification processing of the terminal authentication information by the software acquisition processing in FIG. 7.

Verification processing of terminal authentication information ("Ba" information) by the authentication information verification processing section 311 of the server 30 is as follows. Specifically, the authentication information verification processing section 311 of the server 30 receives software unique key request information ("Ba" information) (step S305 in FIG. 8 and step S305 in FIG. 13), and obtains, from the software unique key request information, the (Ba-1) terminal identification information 101, the (Ba-2) random number, the (Ba-3) software identification information, and the (Ba-4) information (encrypted information) obtained by encrypting the terminal identification information 101, the random number and the software identification information by the terminal unique key 102. And, the authentication information verification processing section 311 retrieves the on-board terminal management DB 300 using the (Ba-1) terminal identification information 101 obtained as a key from the software unique key request information, retrieves the server-side terminal identification information 301 which agrees with the (Ba-1) terminal identification information 101, and obtains its last authentication timestamp 303.

Next, the authentication information verification processing section 311 of the server 30 verifies the software unique key request information (step S306 in FIG. 8 and step S306 in FIG. 13).

Specifically, the authentication information verification processing section 311 compares the last authentication timestamp 303 with the value obtained by subtracting a prescribed threshold from the current timestamp obtained from the clock section 315. And, if the value obtained by subtracting the prescribed threshold from the current timestamp obtained from the clock section 315 is newer than the last authentication timestamp 303, the authentication information verification processing section 311 judges authentication NG (step S307: No in FIG. 8 and FIG. 13), and transmits an authentication information invalid message indicating authentication NG to the communication terminal 20 (step S308 in FIG. 8 and FIG. 13). And, the software transmission section 213 of the communication terminal 20 transmits its authentication information invalid message to the on-board terminal 10, and terminates the processing as the communication terminal 20 (step S309 in FIG. 8 and FIG. 13).

On the other hand, if the value obtained by subtracting the prescribed threshold from the current timestamp obtained from the clock section 315 is older than the last authentication timestamp 303, the authentication information verification processing section 311 encrypts the (Ba-1) terminal identification information 101 of the software unique key request information, the (Ba-2) random number, and the (Ba-3) software identification information using the server side terminal unique key 302 via the cryptographic processing section 314. And, if the encrypted result agrees with the (Ba-4) encrypted information which is encrypted by the on-board terminal 10, the authentication information verification processing section 311 judges that it is an authentication request from the on-board terminal 10 having the correct terminal unique key 102, and the authentication is passed (authentication OK) (step S307: Yes in FIG. 8 and FIG. 13).

And, if the encrypted result does not agree with the (Ba-4) encrypted information which is encrypted by the on-board terminal 10, the authentication information verification processing section 311 determines authentication NG (step S307: No in FIG. 8 and FIG. 13), proceeds to steps S308 and S309, and terminates the processing as the server 30.

If the value obtained by subtracting the prescribed threshold from the current timestamp obtained from the clock section 315 is older than the last authentication timestamp 303, the authentication information verification processing section 311 may verify the software unique key request information by comparing information, which is obtained by decrypting the (Ba-4) encrypted information using the server-side terminal unique key 302 via the cryptographic processing section 314, with the (Ba-1) terminal identification information 101, the (Ba-2) random number and the (Ba-3) software identification information.

As described above, according to the sixth embodiment of the invention, the terminal identification information ("Aa information") held by the communication terminal contains a random number, so that every time the on-board terminal and the communication terminal are connected, the value is different, namely its use is limited to one time, and even if the terminal identification information is obtained without authorization, the terminal identification information obtained without authorization can be invalidated when the threshold period elapses by managing the expiration date of the terminal identification information using the threshold by the server.

Seventh Embodiment

Next, the information distribution system 1 according to a seventh embodiment of the invention is described. The information distribution system 1 according to the seventh embodiment of the invention is an example that terminal identification information and software unique key request information are generated using a counter in the first embodiment to the sixth embodiment of the invention.

The information distribution system according to the seventh embodiment of the invention has an overall configuration which is similar to that of the information distribution system 1 according to the first embodiment to the sixth embodiment of the invention shown in FIG. 1.

And, the individual devices in the information distribution system 1 according to the seventh embodiment of the invention have the same structures as those of individual devices according to the first embodiment to the sixth embodiment of the invention shown in FIG. 2 to FIG. 4. But, differences in functions of the authentication information generation section 111 of the on-board terminal 10 (see FIG. 2) from the first embodiment to the sixth embodiment are described below.

The authentication information generation section 111 of the on-board terminal according to the seventh embodiment of the invention uses a random number when terminal authentication information and software unique key request information used for installation of the software from the server 30 are generated.

Specifically, the authentication information generation section 111 generates, as terminal authentication information (hereinafter called as "Ab" information), information including:

(Ab-1) late described terminal identification information 101 within the storage section 2, and (Ab-3) information (encrypted information) obtained by encrypting the terminal identification information 101 and the value stored in the counter 103 by the cryptographic processing section 114 using the terminal unique key 102 in the storage section 12.

And, the authentication information generation section 111 generates, as software unique key request information (hereinafter called "Bb" information), information including:

(Bb-1) later-described terminal identification information 101 within the storage section 12, (Bb-3) software identification information obtained from the server 30 via the communication terminal 20, and (Bb-4) information (encrypted information) obtained by encrypting the terminal identification information 101, the numerical value stored in the counter 103 and the software identification information by the cryptographic processing section 114 using the terminal unique key 102 within the storage section 12.

Verification processing of the terminal authentication information ("Ab" information) by the authentication information verification processing section 311 of the server 30 is as follows. When a terminal authentication request message attached with the terminal authentication information ("Ab" information) is received from the communication terminal 20 (step S105 in FIG. 6 and step S105 in FIG. 12), the authentication information verification processing section 311 obtains, from its terminal authentication information, (Ab-1) terminal identification information 101, and (Ab-3) information (encrypted information) obtained by encrypting the terminal identification information 101 and the numerical value stored in the counter 103 using the terminal unique key 102. And, the authentication information verification processing section 311 retrieves the on-board terminal management DB 300 within the storage section 32 using as a key the (Ab-1) terminal identification information 101 obtained from the terminal authentication information. Specifically, the authentication information verification processing section 311 retrieves the server-side terminal identification information 301 which agrees with the (Ab-1) terminal identification information 101, and obtains its last authentication timestamp 303.

Next, the authentication information verification processing section 311 compares the last authentication timestamp 303 with a value obtained by subtracting a prescribed current timestamp obtained from the clock section 315. And, if the value obtained by subtracting the prescribed threshold from the current timestamp obtained from the clock section 315 is newer than the last authentication timestamp 303, the authentication information verification processing section 311 determines authentication NG and terminates the processing. On the other hand, if the value obtained by subtracting the prescribed threshold from the current timestamp obtained from the clock section 315 is older than the last authentication timestamp 303, the authentication information verification processing section 311 encrypts the (Ab-1) terminal identification information 101 of the terminal authentication information and a numerical value which is stored as a set with the (Ab-1) terminal identification information 101 stored in the counter management DB 350 using the server-side terminal unique key 302 via the cryptographic processing section 314. And, if the encrypted result agrees with the (Ab-3) encrypted information which is encrypted by the on-board terminal 10, the authentication information verification processing section 311 judges that it is an authentication request from the on-board terminal 10 having the correct terminal unique key 102, and the authentication is passed (authentication OK).

And, in the above processing that the value obtained by subtracting the prescribed threshold from the current timestamp obtained from the clock section 315 is older than the last authentication timestamp 303, if the information obtained by decrypting the (Ab-3) encrypted information by the cryptographic processing section 314 using the server-side terminal unique key 302 agrees with the numerical value stored as a set with the (Ab-1) terminal identification information 101 and the (Ab-1) terminal identification information 101 stored in the counter management DB 350, it is judged as an authentication request from the on-board terminal 10 having the correct terminal unique key 102, and the authentication may be passed (authentication OK).

If the terminal authentication information ("Ab" information) is a first authentication request from the on-board terminal 10 to the server 30 and the information is not stored in the last authentication timestamp 303, the authentication information verification processing section 311 does not compare the current timestamp obtained from the clock section 315 with the last authentication timestamp 303, encrypts the (Ab-1) terminal identification information 101 of the terminal authentication information and the numerical value which is stored as a set with the (Ab-1) terminal identification information 101 store in the counter management DB 350 using the server-side terminal unique key 302, and judges whether or not it agrees with the (Ab-3) encrypted information.

In addition, if the terminal authentication processing is authentication OK and the authentication processing is completed (step S113 in FIG. 6 and FIG. 12), 1 is added to the numerical value stored in the counter 103 of the on-board terminal 10 and the numerical value stored as a set with the (Ab-1) terminal identification information 101 stored in the counter management DB 350.

And, the same processing as above is also performed for the verification processing of the terminal authentication information of the software acquisition processing in FIG. 7.

Verification processing of terminal authentication information ("Bb" information) by the authentication information verification processing section 311 of the server 30 is as follows. Specifically, the authentication information verification processing section 311 of the server 30 receives the software unique key request information ("Bb" information) (step S305 in FIG. 8 and step S305 in FIG. 13), and obtains, from the software unique key request information, the (Bb-1) terminal identification information 101, the (Bb-3) software identification information, and the (Bb-4) information (encrypted information) obtained by encrypting the terminal identification information 101, the numerical value stored in the counter 103 and the software identification information by the terminal unique key 102. And, the authentication information verification processing section 311 retrieves the on-board terminal management DB 300 with the (Bb-1) terminal identification information 101 obtained from the software unique key request information used as a key, retrieves the server-side terminal identification information 301 which agrees with the (Bb-1) terminal identification information 101, and obtains its last authentication timestamp 303.

Next, the authentication information verification processing section 311 of the server 30 verifies the software unique key request information (step S306 in FIG. 8 and step S306 in FIG. 13).

Specifically, the authentication information verification processing section 311 compares the last authentication timestamp 303 with a value obtained by subtracting a prescribed threshold from the current timestamp obtained from the clock section 315. And, if the value obtained by subtracting the prescribed threshold from the current timestamp obtained from the clock section 315 is newer than the last authentication timestamp 303, the authentication information verification processing section 311 judges authentication NG (step S307: No in FIG. 8 and FIG. 13), and transmits an authentication information invalid message indicating authentication NG to the communication terminal 20 (step S308 in FIG. 8 and FIG. 13). And, the software transmission section 213 of the communication terminal 20 transmits its authentication information invalid message to the on-board terminal 10, and terminates the processing as the communication terminal 20 (step S309 in FIG. 8 and FIG. 13).

On the other hand, if the value obtained by subtracting the prescribed threshold from the current timestamp obtained from the clock section 315 is older than the last authentication timestamp 303, the authentication information verification processing section 311 encrypts the (Bb-1) terminal identification information 101 of the software unique key request information, the numerical value stored as a set with the (Bb-1) terminal identification information 101 stored in the counter management DB 350 and the (Bb-3) software identification information using the server-side terminal unique key 302 via the cryptographic processing section 314. And, If the encrypted result agrees with (Bb-4) encrypted information which is encrypted by the on-board terminal 10, the authentication information verification processing section 311 judges that it is an authentication request from the on-board terminal 10 having the correct terminal unique key 102, and the authentication is passed (authentication OK) (step S307: Yes in FIG. 8 and FIG. 13).

And if the encrypted result does not agree with the (Bb-4) encrypted information which is encrypted by the on-board terminal 10, the authentication information verification processing section 311 determines authentication NG (step S307: No in FIG. 8 and FIG. 13), proceeds to steps S308 and S309, and terminates the processing as the server 30.

If the value obtained by subtracting the prescribed threshold from the current timestamp obtained from the clock section 315 is older than the last authentication timestamp 303, the authentic information verification processing section 311 may verify the software unique key request information by comparing the information, which is obtained by decrypting the (Bb-4) encrypted information using the server-side terminal unique key 302 via the cryptographic processing section 314, with the (Bb-1) terminal identification information 101, the numerical value stored as a set with the (Bb-1) terminal identification information 101 stored in the counter management DB 350 and the (Bb-3) software identification information.

In addition, when the authentication processing of the software unique key request information becomes authentication OK and delivery of the software unique key authentication information is completed (step S314 in FIG. 8 and FIG. 13) 1 is added to the numerical value stored in the counter 103 of the onboard terminal 10 and to the numerical value stored as a set with the (Bb-1) terminal identification information 101 stored in the counter management DB 350.

As described above, according to the seventh embodiment of the invention, the terminal identification information ("Ab information") which is held by the communication terminal contains a random number, so that every time the on-board terminal and the communication terminal are connected, the value is different, namely its use is limited to one time, and even if the terminal identification information is obtained without authorization, the terminal identification information obtained without authorization can be invalidated when the threshold period elapses by the expiration date management of terminal identification information using the threshold by the server.

The present invention is not limited to the above-described embodiments but includes various modifications. For example, the above embodiments were described in detail to explain the invention clearly, and they are not limited to those which are provided with all the structures described above. The structure of a certain embodiment can be partly replaced by a structure of another embodiment, and it is also possible to add a structure of another embodiment to the structure of a certain embodiment. Part of the structure of each embodiment can have addition, deletion, and replace of another structure. Control lines and information lines shown are considered necessary for description, but not all control lines and information lines for products are shown necessarily. It may be considered that almost all of the structures are actually connected mutually.

It should be further understood by those skilled in the art that although the foregoing description has been made on embodiments of the invention the invention is not limited thereto and various changes and modifications may be made without departing from the spirit of the invention and the scope of the appended claims.

The invention claimed is:

1. An information distribution system including a communication terminal, an on-board terminal configured to connect to the communication terminal by wire or wireless, and a server, wherein:

the on-board terminal is provided with:
an on-board terminal identification information datastore configured to store terminal identification information inherent to the on-board terminal,
an authentication information generator configured to generate the on-board terminal authentication information including the terminal identification information stored in the on-board terminal identification datastore, and
an inter-terminal equipment communicator configured to transmit the authentication information generated by the authentication information generator to the communication terminal, the communication terminal is provided with:
an inter-equipment communicator configured to connect to the on-board terminal by wire or wireless,
a communication terminal datastore configured to store the on-board terminal authentication information received by the inter-equipment communication section, and
a server communicator configured to transmit the on-board terminal authentication information stored in the communication terminal datastore to the server, the server is provided with:
a terminal communicator configured to receive the on-board terminal authentication information from the communication terminal,
an authentication information verifier configured to authenticate the on-board terminal authentication information received by the terminal communication section,
a last authentication timestamp datastore configured to store a timestamp when authentication is successfully verified by the authentication information verifier, and
an authentication information manager configured to store the timestamp, when the authentication is successfully verified by the authentication information verifier, into the last authentication timestamp datastore, and wherein the server, when it receives the on-board terminal authentication information from the communication terminal, is configured to authenticate the on-board terminal authentication information using a timestamp when the on-board terminal authentication information is authenticated by the authentication information verifier, and a timestamp stored in the last authentication timestamp datastore, and wherein the authentication information verifier is further configured to manage an expiration date of the on-board terminal software using a last authentication timestamp inherent to the on-board terminal software stored in the software management database.

2. The information distribution system according to claim 1, wherein:
the server is provided with a software delivery section for delivering software for the on-board terminal, and
the authentication information management section stores the timestamp, when delivery of the software for the on-board terminal is completed, into the last authentication timestamp storage section.

3. The information distribution system according to claim 1, wherein:
the server is provided with a cryptographic processor for encrypting and delivering the on-board terminal software, and a software unique key storage section for encrypting the on-board terminal software, and
the authentication information manager stores timestamp when delivery of the software unique key to the last authentication timestamp datastore is completed.

4. The information distribution system according to claim 1, wherein the server is configured to manage the number of delivery times of the on-board terminal software.

5. The information distribution system according to claim 4, wherein the server is configured to manage the number of delivery times of the software unique key.

6. The information distribution system according to claim 1, wherein the on-board terminal authentication information includes a random number.

7. The information distribution system according to claim 1, wherein the on-board terminal authentication information includes a numerical value which is commonly possessed by the on-board terminal and the server.

8. The system of claim 1, wherein the communication terminal is further configured to store software data received from the server.

* * * * *